(12) United States Patent
Soni

(10) Patent No.: US 11,003,627 B2
(45) Date of Patent: May 11, 2021

(54) PRIORITIZING THUMBNAIL PREVIEWS BASED ON MESSAGE CONTENT

(71) Applicant: Microsoft Technology Licensing, LLC, Redmond, WA (US)

(72) Inventor: Shahil Soni, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 221 days.

(21) Appl. No.: 15/134,819

(22) Filed: Apr. 21, 2016

(65) Prior Publication Data

US 2017/0308545 A1  Oct. 26, 2017

(51) Int. Cl.
*G06F 16/00* (2019.01)
*G06F 16/16* (2019.01)
*G06F 16/14* (2019.01)

(52) U.S. Cl.
CPC .......... *G06F 16/168* (2019.01); *G06F 16/148* (2019.01); *G06F 16/156* (2019.01); *G06F 16/164* (2019.01)

(58) Field of Classification Search
CPC ......... G06F 17/30106; G06F 17/30126; G06F 17/3012; G06F 17/30112; G06F 17/30
See application file for complete search history.

(56) References Cited

U.S. PATENT DOCUMENTS

| | | | |
|---|---|---|---|
| 6,964,025 B2 | 11/2005 | Angiulo et al. | |
| 7,444,598 B2 | 10/2008 | Horvitz et al. | |
| 7,496,830 B2 | 2/2009 | Rubin et al. | |
| 7,506,263 B1 | 3/2009 | Johnston et al. | |
| 7,970,771 B2 | 6/2011 | Rasmussen et al. | |
| 8,028,032 B2 | 9/2011 | Laird-McConnell | |
| 8,065,369 B2 | 11/2011 | Turski et al. | |

(Continued)

FOREIGN PATENT DOCUMENTS

| | | |
|---|---|---|
| CN | 102592214 A | 7/2012 |
| CN | 103210371 A | 7/2013 |
| WO | 2008033648 | 3/2008 |

OTHER PUBLICATIONS

U.S. Appl. No. 14/032,151, Office Action dated Jul. 28, 2016, 15 pages.

(Continued)

*Primary Examiner* — Ashish Thomas
*Assistant Examiner* — Suman Rajaputra

(57) ABSTRACT

Systems for prioritizing thumbnail previews within a message are described. A thumbnail prioritization application may automatically identify files that are most applicable and/or relevant to a message. When more than one file is applicable to a message, each file may be ranked based on its predicted relevance to the message. In this way, a subset of relevant files is identified, as well as identifying the most relevant files within the subset. Thumbnail previews may further link directly to a corresponding file within storage, enabling recipients of a message to easily and efficiently identify and directly access files that are most applicable to the message. Because relevant files are automatically identified, neither the sender nor the recipient(s) are required to search through multiple files to locate applicable files. Accordingly, user burden is reduced and user efficiency is increased, leading to a better overall user experience.

20 Claims, 11 Drawing Sheets

(56) References Cited

U.S. PATENT DOCUMENTS

| | | | |
|---|---|---|---|
| 8,090,779 B2 | 1/2012 | Ludwig | |
| 8,135,617 B1 | 3/2012 | Agostino | |
| 8,136,051 B2 | 3/2012 | Friedlander et al. | |
| 8,205,172 B2 | 6/2012 | Wong | |
| 8,782,538 B1 | 7/2014 | Skare | |
| 9,049,261 B2 | 6/2015 | Shiplacoff et al. | |
| 2004/0003351 A1 | 1/2004 | Sommerer | |
| 2004/0073616 A1* | 4/2004 | Fellenstein | G06Q 10/107 709/206 |
| 2004/0205514 A1 | 10/2004 | Sommerer et al. | |
| 2004/0267700 A1 | 12/2004 | Dumais et al. | |
| 2005/0144573 A1 | 6/2005 | Moody et al. | |
| 2006/0123360 A1 | 6/2006 | Anwar | |
| 2006/0203620 A1 | 9/2006 | Bedingfield, Sr. | |
| 2006/0224997 A1 | 10/2006 | Wong | |
| 2007/0156826 A1 | 7/2007 | Lu | |
| 2007/0264948 A1 | 11/2007 | Jansson et al. | |
| 2008/0043943 A1 | 2/2008 | Sipher et al. | |
| 2008/0126951 A1 | 5/2008 | Sood et al. | |
| 2008/0171535 A1 | 7/2008 | Crmody | |
| 2008/0201437 A1 | 8/2008 | Ludwig | |
| 2008/0235335 A1 | 9/2008 | Hintermeister et al. | |
| 2008/0270560 A1 | 10/2008 | Tysowski et al. | |
| 2009/0042542 A1 | 2/2009 | Dias | |
| 2009/0089382 A1 | 4/2009 | Garrett | |
| 2009/0106674 A1 | 4/2009 | Bray et al. | |
| 2009/0271486 A1 | 10/2009 | Ligh et al. | |
| 2009/0327883 A1 | 12/2009 | Robertson et al. | |
| 2009/0327972 A1 | 12/2009 | McCann | |
| 2010/0064017 A1 | 3/2010 | Buchheit et al. | |
| 2010/0088376 A1 | 4/2010 | Kunz | |
| 2010/0131523 A1* | 5/2010 | Yu | G06Q 10/107 707/756 |
| 2010/0162138 A1 | 6/2010 | Pascal et al. | |
| 2010/0162174 A1 | 6/2010 | Karidi et al. | |
| 2010/0169264 A1 | 7/2010 | O'Sullivan et al. | |
| 2010/0169826 A1 | 7/2010 | Keereepart et al. | |
| 2010/0273457 A1 | 10/2010 | Freeman et al. | |
| 2011/0004831 A1 | 1/2011 | Steinberg et al. | |
| 2011/0072363 A1 | 3/2011 | Mandel | |
| 2011/0145353 A1 | 6/2011 | Yuyama | |
| 2011/0145698 A1 | 6/2011 | Penov et al. | |
| 2011/0145744 A1 | 6/2011 | Haynes | |
| 2011/0173210 A1 | 7/2011 | Ahn et al. | |
| 2011/0231499 A1 | 9/2011 | Stovicek | |
| 2011/0280476 A1 | 11/2011 | Berger et al. | |
| 2012/0047460 A1 | 2/2012 | Mccann et al. | |
| 2012/0109836 A1 | 5/2012 | Chen et al. | |
| 2012/0131474 A1 | 5/2012 | Panchadsaram et al. | |
| 2012/0158843 A1 | 6/2012 | Angani et al. | |
| 2012/0185797 A1 | 7/2012 | Thorsen | |
| 2012/0191716 A1 | 7/2012 | Omoigui | |
| 2012/0233531 A1 | 9/2012 | Ma et al. | |
| 2012/0272160 A1* | 10/2012 | Spivack | G06Q 10/10 715/752 |
| 2013/0066984 A1* | 3/2013 | Shin | H04L 12/1854 709/206 |
| 2013/0091465 A1 | 4/2013 | Kikin-Gil et al. | |
| 2013/0110815 A1 | 5/2013 | Tankovich et al. | |
| 2013/0110940 A1 | 5/2013 | Pasquero et al. | |
| 2013/0125063 A1 | 5/2013 | Lee | |
| 2013/0205187 A1 | 8/2013 | Hawkins | |
| 2013/0218897 A1 | 8/2013 | Palay | |
| 2013/0262438 A1 | 10/2013 | Palay | |
| 2013/0262605 A1 | 10/2013 | Buchheit et al. | |
| 2013/0328665 A1 | 12/2013 | Cranfill et al. | |
| 2014/0067974 A1 | 3/2014 | Lewinson et al. | |
| 2014/0082521 A1 | 3/2014 | Carolan et al. | |
| 2014/0229270 A1 | 8/2014 | Rashwan | |
| 2014/0281895 A1 | 9/2014 | Tay | |
| 2014/0304613 A1 | 10/2014 | Coe | |
| 2015/0032692 A1 | 1/2015 | Litzenberger | |
| 2015/0032829 A1 | 1/2015 | Barshow et al. | |
| 2015/0082189 A1 | 3/2015 | Baer et al. | |
| 2015/0095088 A1 | 4/2015 | Dabbiru et al. | |
| 2015/0106740 A1 | 4/2015 | Friend et al. | |
| 2015/0106741 A1 | 4/2015 | Friend et al. | |
| 2015/0143211 A1 | 5/2015 | Kaufthal et al. | |
| 2015/0186366 A1 | 7/2015 | Yan et al. | |
| 2015/0186381 A1* | 7/2015 | Yan | G06F 16/16 707/728 |
| 2015/0220500 A1 | 8/2015 | Katic | |
| 2016/0147782 A1 | 5/2016 | Roseman et al. | |
| 2017/0126608 A1 | 5/2017 | Friend et al. | |

OTHER PUBLICATIONS

U.S. Appl. No. 14/054,625, Amendment and Response filed Aug. 9, 2016, 15 pages.

U.S. Appl. No. 14/082,479, Office Action dated May 26, 2016, 20 pgs.

U.S. Appl. No. 14/032,151, Amendment and Response filed Oct. 20, 2016, 11 pages.

U.S. Appl. No. 14/032,151, Office Action dated Dec. 2, 2016, 15 pages.

U.S. Appl. No. 14/032,151, Amendment and Response filed Feb. 8, 2017, 12 pages.

U.S. Appl. No. 14/032,151, Office Action dated Feb. 23, 2017, 14 pages.

U.S. Appl. No. 14/032,151, Amendment and Response filed May 2, 2017, 11 pages.

U.S. Appl. No. 14/032,151, Notice of Allowance dated Jun. 30, 2017, 7 pages.

U.S. Appl. No. 14/054,625, Office Action dated Oct. 19, 2016, 25 pages.

PCT International Search Report and Written Opinion in International Application PCT/US2017/026884, dated May 31, 2017, 12 pages.

Weverka, "Microsoft OneNote 2010 Plain & Simple", Microsoft Press, Sep. 27, 2011, 8 pages.

European Communication in 14809179.6, dated Jul. 1, 2016, 2 pages.

U.S. Appl. No. 14/032,151, Office Action dated Apr. 14, 2016, 15 pages.

U.S. Appl. No. 14/032,151, Amendment and Response filed Jul. 14, 2016, 14 pages.

U.S. Appl. No. 14/054,625, Office Action dated May 18, 2016, 24 pages.

"Mac iWork Pages: How Can I Create Internal Links?", Published on: Jan. 19, 2011, Available at: http://superuser.com/questions/235001/mac-iwork-pages-how-can-i-create-internal-links, 2 pgs.

"Pages for iOS (iPhone, iPod touch): Hyperlink Text in a Document", Published on: Sep. 26, 2012, Available at: http://support.apple.com/kb/PH3581, 2 pgs.

Ali, et al., "Adaptive Layout for Interactive Documents", In Proceedings of the 9th International Symposium on Smart Graphics, Aug. 27, 2008, 8 pages.

Banks, Emmanuel, "Mailbox Review: The Best Email Client Ever—Lifehack", Published on: Feb. 15, 2013, Available at: http://www.lifehack.org/articles/technology/mailbox-review-transforms-your-email-inbox-into-a-to-do-list.html, 12 pgs.

Bhaowal, Mayukh, "Bringing Links to Life with Link Preview", Published on: Mar. 12, 2014, Available at: http://yahoomail.tumblr.com/post/79395405926/bringing-links-to-life-with-link-preview, 5 pgs.

Fisher, Jon, "View and Organize Multiple Email Accounts Like Never Before with AL TO Mail", Published on: Jun. 25, 2013, Available at: http://www.technorms.com/28959/organize-multiple-email-accounts-with-alto-mail, 10 pgs.

Gaskell, et al., "Creating a Link?", Published on: Jun. 16, 2009, Available at: https://confluence.atlassian.com/display/CONF30/Rich+Text-Creating+and+removing+a+link, 2 pgs.

International Search Report & Written Opinion for PCT Application No. PCT/US2014/059990, dated Apr. 16, 2015, 11 Pages. (MS# 339691.02).

International Search Report and Written Opinion Issued in PCT Application No. PCT/US2014/055970, dated Apr. 13, 2015, 14 Pages. (MS# 339692.02).

(56) References Cited

OTHER PUBLICATIONS

Lardinois, Frederic, "Google Drive Gets Updated Link Tool for Docs and Slide with Integrated Google Search", Published on: Aug. 6, 2013, Available at: http://techcrunch.com/2013/08/06/google-drive-gets-updated-link-tool-for-docs-and-slide-with-integrated-google-search/, 2 pgs.
Ma, Francis, "Deep Linking from Mobile Apps", Published on: Nov. 15, 2012, Available at: http://www.googblogs.com/uncategorized/deep-linking-from-mobile-apps/, 3 pgs.
PCT 2nd Written Opinion in International Application PCT/US2014/065593, dated Sep. 24, 2015, 5 pgs.
PCT International Search Report and Written Opinion Issued in PCT Patent Application No. PCT/US2014/065593, dated Mar. 6, 2015, 10 Pages.
Rao, Leena, "Handle is a Priority Engine and Task Management App for Your Inbox", Published on: Apr. 29, 2013, Available at: http://techcrunch.com/2013/04/29/handle-is-a-priority-engine-and-task-management-app-for-your-inbox/, 6 pgs.
Siu, et al., "Going with the Flow: Email Awareness and Task Management", In Proceedings of the 20th Anniversary Conference on Computer Supported Cooperative Work, Nov. 4, 2006, 10 pages.
Taylor, Tiffany, "Introducing Rich Link Preview", Published on: Nov. 15, 2012, Available at: http://blog.socialcast.com/introducing-rich-link-preview/, 2 pgs.
Terdiman, Daniel, "Pigs Fly: AOL's New e-mail Client makes Inboxes a Happy Place", Published on: Oct. 18, 2012, Available at: http://news.cnet.com/8301-1023 3-57533796-93/pigs-fly-aols-new-e-mail-client-makes-inboxes-a-happy-place/?subj, 8 pgs.
U.S. Appl. No. 14/032,151, Amendment and Response filed Jan. 22, 2016, 15 pgs.
U.S. Appl. No. 14/032,151, Office Action dated Oct. 21, 2015, 16 pgs.
U.S. Appl. No. 14/054,625, Amendment and Response filed Feb. 1, 2016, 12 pgs.
U.S. Appl. No. 14/054,625, Amendment and Response filed Sep. 17, 2015, 12pgs.
U.S. Appl. No. 14/054,625, Office Action dated Nov. 6, 2015, 26 pgs.
U.S. Appl. No. 14/054,625, Office Action dated Jun. 17, 2015, 35 pgs.
U.S. Appl. No. 14/082,479, Amendment and Response filed Feb. 12, 2016, 8 pgs.
U.S. Appl. No. 14/082,479, Office Action dated Oct. 13, 2015, 16 pgs.
Whittaker, et al., "Am I Wasting My Time Organizing Email? A Study of Email Refinding", In Proceedings of the SIGCHI Conference on Human Factors in Computing Systems, May 7, 2011, 10 pages.
Zhu, et al., "Context-Aware Informative Display", In IEEE International Conference on Multimedia and Expo, Jul. 2, 2007, 4 pages.
"Search Report Issued in European Patent Application No. 14787368.1", dated May 11, 2017, 8 Pages. (MS# 339691-EP-EPT).
"Office Action Issued in Chinese Patent Application No. 201480056900.6", dated Mar. 14, 2018, 17 Pages. (MS# 339691-CN-PCT).
"First Office Action and Search Report Issued in Chinese Patent Application No. 201480062988.2", dated Sep. 13, 2018, 13 Pages. (MS# 339882-CN-PCT).
"International Preliminary Report on Patentability Issued in PCT Application No. PCT/US2014/065593", dated Jan. 27, 2016, 7 Pages. (MS# 339882-WO-PCT).
"Office Action Issued in Chinese Patent Application No. 201480056900.6", dated Nov. 23, 2018, 5 Pages. (MS# 339691-CN-PCT).
"Non Final Office Action Issued in U.S. Appl. No. 15/409,493", dated Mar. 8, 2019, 22 Pages. (MS# 339691-US-CNT).
"Final Office Action Issued in U.S. Appl. No. 15/409,493", dated Aug. 22, 2019, 10 Pages. (MS# 339691-US-CNT).
"Non-Final Office Action Issued in U.S. Appl. No. 15/409,493", dated Dec. 12, 2019, 9 Pages. (MS# 339691-US-CNT).
Legrand, Andrew, "Use Boomerang to Make Your Email Vanish, but Return When You Need It", Retrieved from: https://www.americanbar.org/groups/gpsolo/publications/gpsolo_ereport/2012/november_2012/ use_boomerang_make_email_vanish_return/, Nov. 1, 2012, 3 Pages.
"Office Action Issued in European Patent Application No. 14787368.1", dated Aug. 7, 2020, 4 Pages (MS# 339691-EP-EPT).
"Summons to Attend Oral Proceedings Issued in European Patent Application No. 14787368.1", dated Mar. 25, 2020, 8 Pages. (MS# 339691-EP-EPT).
"Final Office Action Issued in U.S. Appl. No. 15/409,493", dated Mar. 19, 2020, 9 Pages. (MS# 339691-US-CNT).

\* cited by examiner

Figure 3:
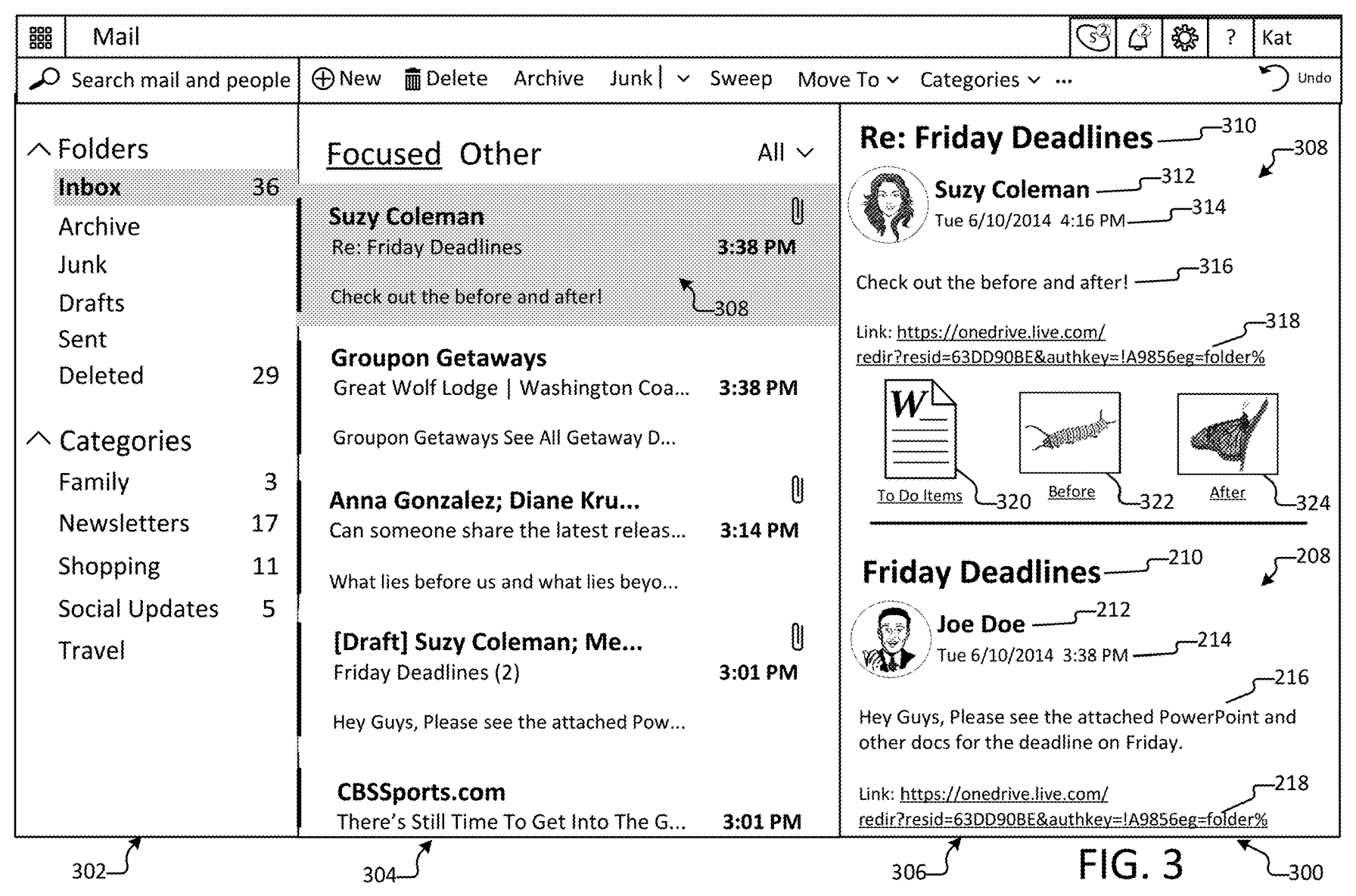

Mail

Search mail and people

⊕ New | 🗑 Delete | Archive | Junk | ∨ | Sweep | Move To ∨ | Categories ∨ | ...

Folders
- Inbox — 36
- Archive
- Junk
- Drafts
- Sent
- Deleted — 29

Categories
- Family — 3
- Newsletters — 17
- Shopping — 11
- Social Updates — 5
- Travel

Focused Other | All ∨

Suzy Coleman — 3:38 PM
Re: Friday Deadlines
Check out the before and after! — 308

Groupon Getaways — 3:38 PM
Great Wolf Lodge | Washington Coa...
Groupon Getaways See All Getaway D...

Anna Gonzalez; Diane Kru... — 3:14 PM
Can someone share the latest releas...
What lies before us and what lies beyo...

[Draft] Suzy Coleman; Me... — 3:01 PM
Friday Deadlines (2)
Hey Guys, Please see the attached Pow...

CBSSports.com — 3:01 PM
There's Still Time To Get Into The G...

---

Re: Friday Deadlines — 310

Suzy Coleman — 312
Tue 6/10/2014 4:16 PM — 314

Check out the before and after! — 316

Link: https://onedrive.live.com/
redir?resid=63DD90BE&authkey=1A9856eg=folder%
— 318

[image: Before] — 320,322
[image: After] — 324

To Do Items — 208

Friday Deadlines — 210

Joe Doe — 212
Tue 6/10/2014 3:38 PM — 214

Hey Guys, Please see the attached PowerPoint and other docs for the deadline on Friday. — 216

Link: https://onedrive.live.com/
redir?resid=63DD90BE&authkey=1A9856eg=folder%
— 218

PRIORITIZING THUMBNAIL PREVIEWS BASED ON MESSAGE CONTENT

BACKGROUND

Collaboration increasingly involves communications concerning stored files that are exchanged between users in the form of a uniform resource locator (URL) hyperlink. For instance, the URL may identify a folder containing multiple files that is stored in a cloud computing environment. The folder of files may involve many file types, such as word processing documents, spreadsheet documents, presentation documents, video files, audio files, image files, and the like. While a sender could locate one or more files within the folder for attachment to a message, the sender may find it more convenient and efficient to simple include the URL link to the folder. In some instances, thumbnail previews for a subset of the files in the folder may be presented within the body of the message. However, the thumbnail previews are generally provided in alphabetical or temporal order and do not necessarily provide the most important or pertinent files to the recipient. In this case, the recipient is required to follow the URL link and manually locate the most pertinent or important files within the folder. In some cases, the URL may link to many, many files, e.g., twenty to a hundred files or more, and the recipient may be required to open and/or scan each file to identify any files important to or referenced in the message.

It is with respect to these and other general considerations that embodiments have been described. Also, although relatively specific problems have been discussed, it should be understood that the embodiments should not be limited to solving the specific problems identified in the background.

SUMMARY

The disclosure generally relates to a system and methods for presenting prioritized thumbnail previews. In aspects, when a user drafts a message to one or more recipients that includes a link to a plurality of files, some of the linked files may be more important or relevant to the message than others. The plurality of files may be stored in a folder and, in some cases, tens, fifties, or hundreds of files may be located in the folder. However, the message may be specific or applicable to only a subset of the plurality of files within the folder. Even so, the sender of the message may find it burdensome and/or inefficient to locate and attach the specific or applicable files to the message. Rather, the sender may find it more convenient to simply include a link to the folder in storage. In this case, the one or more recipients of the message may find it burdensome and/or inefficient to search the plurality of files in the folder to identify the particular files relevant to the message. This is particularly true when a vast number of files and types of files are included in the folder.

A thumbnail prioritization application addresses the above issues by automatically identifying files within a plurality of files that are applicable and/or relevant to a message. In aspects, a relevant file within the plurality of files may be identified when it matches a key message term extracted from the message. When more than one file matches key message terms associated with the message, each file may be ranked based on a predicted relevance to the message. In this way, from the plurality of files, a subset of relevant files is identified, and from the subset, the most relevant files to the message are identified. Each thumbnail preview may further link directly to a corresponding file within storage, enabling recipients of a message to easily and efficiently identify and directly access files that are most applicable to the message. Because files that are most relevant to a message are automatically identified, neither the sender nor the recipient(s) are required to search through the plurality of files to locate applicable files. Accordingly, the burden on users is reduced and user efficiency is increased, which leads to a better overall user experience.

In one aspect, a system is provided. The system includes a processing unit and a memory storing computer executable instructions that, when executed by the processing unit, cause the system to perform a method. The method includes receiving a message and extracting information from the message. The method further includes analyzing the extracted information to identify key message terms and then prioritizing the key message terms. Additionally, the method involves matching the key message terms to one or more files of a plurality of files linked to the message and then ranking the one or more files. The method further includes presenting a thumbnail preview corresponding to at least the highest ranked file.

In another aspect, a method is provided. The method includes receiving a message and analyzing extracted information from the message to identify key message terms. The key message terms are prioritized and matched to one or more files of a plurality of files linked to the message. The one or more files are ranked and thumbnail previews corresponding to each of the one or more files are presented in descending rank order.

In yet another aspect, a computer-readable storage medium is provided. The computer-readable storage medium stores computer executable instructions that, when executed by at least one processing unit, cause a computing device to receive a message and analyze extracted information from the message to identify one or more key message terms. The key message terms are prioritized and matched to one or more files of a plurality of files linked to the message. The one or more files are ranked and a thumbnail preview corresponding to each of the one or more files is presented in descending rank order.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 2 illustrates an interface for implementing thumbnail prioritization within a message, according to an example embodiment.

FIG. 3 illustrates an interface for implementing thumbnail prioritization within a reply message, according to an example embodiment.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

As described above, the disclosure generally relates to systems and methods for prioritizing thumbnail previews within a message. In particular, a thumbnail prioritization application may automatically identify files that are most applicable and/or relevant to a message. When more than one file is applicable to a message, each file may be ranked based on its predicted relevance to the message. In this way, from the plurality of files, a subset of relevant files is identified, and from the subset, the most relevant files to the message are identified. Each thumbnail preview may further link directly to a corresponding file within storage, enabling recipients of a message to easily and efficiently identify and directly access files that are most applicable to the message. Because files that are most relevant to a message are automatically identified, neither the sender nor the recipient(s) are required to search through the plurality of files to locate applicable files. Accordingly, the user burden is reduced and user efficiency is increased, leading to a better overall user experience.

It is with respect to these and other general considerations that embodiments have been made.

Figure 1:
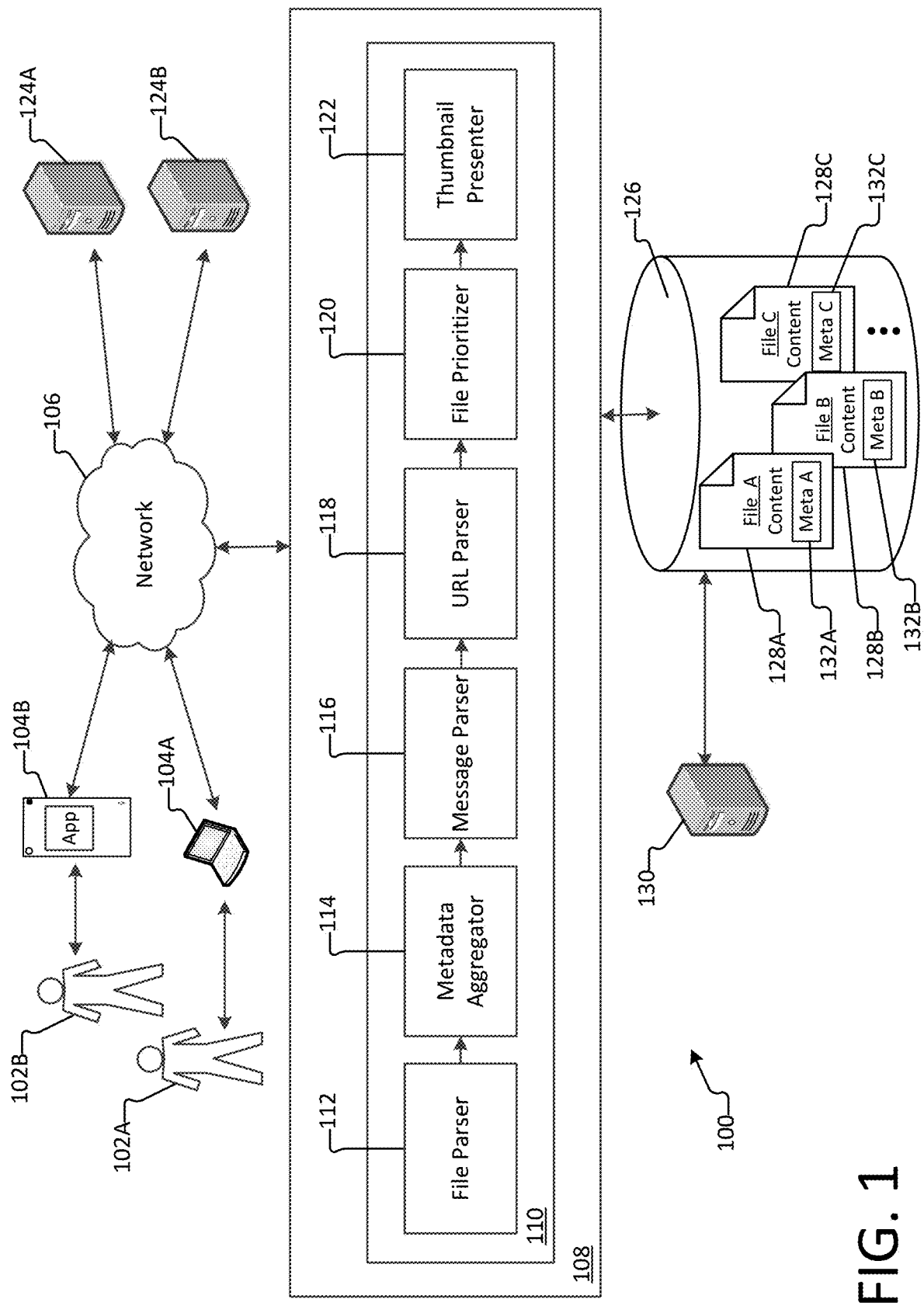
FIG. 1 illustrates a system for prioritizing thumbnail previews based on message content, according to an example embodiment.

FIG. 1 illustrates a system 100 for prioritizing thumbnail previews based on message content, according to an example embodiment.

As illustrated, system 100 may comprise one or more client computing devices 104 (e.g., client computing devices 104A and 104B) that may execute a client version of a thumbnail prioritization application capable of prioritizing thumbnail previews for a plurality of files and presenting the thumbnail previews in a ranked order within a message. In some examples, the client thumbnail prioritization application may execute locally on a client computing device 104. For example, the client thumbnail prioritization application (e.g., mobile app) may operate in communication (e.g., via network 106) with a corresponding server version of thumbnail prioritization application 110 executing on one or more server computing devices, e.g., server computing device 108. In still other aspects, rather than executing a client version of a thumbnail prioritization application, the one or more client computing devices 104 may remotely access, e.g., via a browser over network 106, the thumbnail prioritization application 110 implemented on the one or more server computing devices 108. In this regard, thumbnail prioritization application 110 is capable of prioritizing thumbnail previews and presenting the thumbnail previews in ranked order to a user.

In a basic configuration, the one or more client computing devices 104 are personal or handheld computers having both input elements and output elements operated by one or more users 102 (e.g., user 102A and user 102B). For example, the one or more client computing devices 104 may include one or more of: a mobile telephone; a smart phone; a tablet; a phablet; a smart watch; a wearable computer; a personal computer; a desktop computer; a laptop computer; a gaming device/computer (e.g., Xbox®); a television; and the like. This list is exemplary only and should not be considered as limiting. Any suitable client computing device for executing a client thumbnail prioritization application and/or remotely accessing thumbnail prioritization application 110 may be utilized.

In some aspects, network 106 is a computer network such as an enterprise intranet and/or the Internet. In this regard, the network 106 may include a Local Area Network (LAN), a Wide Area Network (WAN), the Internet, wireless and wired transmission mediums. In further aspects, server computing device 108 may communicate with some components of the system via a local network (e.g., an enterprise intranet), whereas server computing device 108 may communicate with other components of the system via a wide area network (e.g., the Internet). In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet.

As described above, the thumbnail prioritization application 110 may be implemented on a server computing device 108. In a basic configuration, server computing device 108 may include at least a processing unit and a system memory for executing computer-readable instructions. In some aspects, server computing device 108 may comprise one or more server computing devices 108 in a distributed environment (e.g., cloud-based computing environment). Server computing device 108 may provide data and/or metadata regarding a file to and from the one or more client computing devices 104 and/or one or more other server computing devices (e.g., server computing devices 124A and/or 124B) via network 106.

As used herein, a file may be classified as a "file type" and may be provided in any suitable file format, e.g., a word processing document (e.g., .doc, .docx, etc.), a video (.wmv, .webm, .mpg, .gif, etc.), an audio (.wav, etc.), an image (.jpeg, .png, .gif, etc.), an email (e.g., .msg, .emix, .dbx, etc.), a webpage (.html, .htm, .xhtml, .xht, etc.), a presentation document (e.g., .ppt, .pptx, .pez, etc.), a spreadsheet document (e.g., .xls, .xlsx, .xlt, etc.), and the like. A file may also be defined by "file content," which involves internal content (e.g., terms, phrases, names, numerical data, charts, tables, images, title, etc.), derived content (e.g., face recognition data, image recognition data, audio-to-text transcription data, etc.), metadata content (author, creation date, file name, file tags, aspect ratio, file size, etc.), and the like. A file may further have a "file extension" (e.g., .docx, .ppt, .jpeg, etc.), where a file extension is indicative of a file type (e.g., a word processing document, a presentation document, an image, etc.). As used herein, "original metadata" refers to metadata appended to a file by a file creation application (e.g., image creation application, word processing application, spreadsheet application, and the like) and "aggregated metadata" refers to metadata appended to a file by thumbnail prioritization application 110, and/or by one of its components or modules.

As should be appreciated, one or more files (e.g., files 128A, 128B, and 128C) may be stored in one or more storage locations accessible to thumbnail prioritization application 110, e.g., storage 126. In at least some examples, the one or more files may be stored in different storage locations within a distributed environment (e.g., cloud-based computing environment) that is accessible to the thumbnail prioritization application 110 over a network, e.g., network 106.

As illustrated in FIG. 1, the thumbnail prioritization application 110 may include a file parser 112, a metadata aggregator 114, a message parser 116, a URL parser 118, a file prioritizer 120, and a thumbnail presenter 122. The various components may be implemented using hardware, software, or a combination of hardware and software. Moreover, the various components may be executed on the same server computing device (e.g., server computing device 108) or on other server computing devices (e.g., server computing devices 124A, 124B and/or 130). As described above, the thumbnail prioritization application 110 may be configured to prioritize thumbnail previews for a plurality of files and present the thumbnail previews in a ranked order within a message. In some aspects, the thumbnail prioritization application 110 may undertake one or more pre-processing steps in order to accomplish thumbnail prioritization.

For instance, when a file is received, e.g., for storage in storage 126, file parser 112 may parse the received file to detect file content and/or a file extension. In some aspects, file parser 112 may be implemented by server 108. In other aspects, file parser 112 may be implemented by another server, for instance, a server such as server 130 that is in communication with and/or manages a storage location, e.g., storage 126. As described above, file content may include internal content, derived content, metadata content, etc. Some file content may be detected based on original metadata associated with the received file. For example, an image creation application may append information such as image category (e.g., "turtle," "bird," etc.), image name and/or title (e.g., "New York," "Jennifer's Birthday," etc.), and the like, as original metadata to an image file. In some cases, an author or creator of an image file may assign file content to the image file, e.g., category, name, title, etc., and the image creation application may store such information as original metadata to the image file. In other cases, the image creation application may be configured to detect file content, e.g., via face recognition, image recognition, text analysis, or otherwise, and may store such information as original metadata to the image file. Regardless of how an image creation application identifies and stores original metadata, file parser 112 may detect such information as indicative of file content for the image file. As should be appreciated, other file creation applications, e.g., word processing applications, spreadsheet applications, and the like, may similarly append information regarding file content as original metadata upon creation or editing of a file and file parser 112 may similarly detect such information as indicative of file content.

Metadata aggregator 114 may receive file content and/or a file extension from file parser 112 for each file received for storage, e.g., storage 126. In some aspects, metadata aggregator 114 may be implemented by server 108. In other aspects, metadata aggregator 114 may be implemented by another server, for instance, a server such as server 130 that is in communication with and/or manages a storage location, e.g., storage 126. As detailed above, file content may include internal content (e.g., terms, phrases, names, numerical data, charts, tables, images, title, etc.), derived content (e.g., face recognition data, image recognition data, audio-to-text transcription data, etc.), metadata content (author, creation date, file name, file tags, etc.), and the like. A file may further be associated with a file extension (e.g., .docx, .ppt, .jpeg, etc.), where a file extension is indicative of a file type (e.g., a word processing document, a presentation document, an image, etc.). Metadata aggregator 114 may collect and/or generate metadata indicative of the file content and/or the file type for each file. Metadata aggregator 114 may further aggregate the metadata and may organize the aggregated metadata into structured fields, with each field storing a different type of aggregated metadata. In aspects, "metadata syntax" may refer to rules for structuring the fields that store the aggregated metadata.

In further aspects, metadata aggregator 114 may append the structured fields of aggregated metadata to each file. For instance, as illustrated by FIG. 1, first aggregated metadata (e.g., Meta A 132A) may be appended to a first file (e.g., File A 128A) that is stored in storage 126, second aggregated metadata (e.g., Meta B 132B) may be appended to a second file (e.g., File B 128B) that is stored in storage 126, and third aggregated metadata (e.g., Meta C 132C) may be appended to a third file (e.g., File C 128C) that is stored in storage 126. In some aspects, the aggregated metadata may incorporate the original metadata associated with each file such that the original metadata is organized within the structured fields of aggregated metadata. In other aspects, the aggregated metadata may be organized into the structured fields and stored in a separate location from the original metadata associated with a file. In some examples, aggregated metadata may be stored with the file by metadata aggregator 114 as a pre-processing step when each file is stored in storage 126; in other examples, aggregated metadata may be stored with the file by metadata aggregator 114 during file processing at some other time.

In an example, a user (e.g., user 102A) may draft a message to another user (e.g., user 102B) using a messaging application, e.g., an email application, an instant messaging application, a SMS application, and the like. The messaging application may be in communication with and/or incorporated with the thumbnail prioritization application 110. For example, the message may include one or more message fields, such as a "Subject" field, a "To" field, a "From" field, a "Message Body" field, and the like. The "To" field may include at least one user identifier for each recipient of the message (e.g., recipient identifier(s)) and the "From" field may include at least one user identifier for a sender of the message (e.g., sender identifier). A user identifier may be a user name (or user alias), a user email address, a user phone number, and the like. User identifiers may be used by the messaging application to route the message from the sender to the one or more recipients of the message. User identifiers may further communicate the identity of the sender of the message to the one or more recipients, as well as other recipients of the message to the one or more recipients.

In further examples, the sender may enter subject content into the Subject field of the message to indicate a topic, a purpose, a task, or other information regarding the message. In still further examples, the sender may enter message content into the Message Body field of the message. Message content may include a narrative, a description, instructions, or other information for communication to the one or more recipients of the message. The message content may further include a link to a plurality of files stored in a storage location. In aspects, the link may be a uniform resource locator (URL) mapped to the storage location (e.g., storage 126) comprising the plurality of files (e.g., File A 128A, File B 128B, File C 128C, etc.). In some aspects, the plurality of files may be stored in a folder (not shown) associated with the link within storage 126.

At any time during drafting of a message, routing of a message and/or receipt of a message, message parser 116 may process the message to extract and analyze information from the one or more message fields, e.g., sender identifier, recipient identifier, subject content, message content, and the like. In some aspects, message parser 116 may be implemented by server 108. In other aspects, message parser 116 may be implemented by another server, for instance, a server that is in communication with and/or implements a messaging application. For example, message parser 116 may extract information from the message and analyze the extracted information to identify key message terms and/or key message phrases (hereinafter referred to collectively as "key message terms"). As used herein, a key message term may be indicative of file content or a file type for one or more files. Key message terms may be identified by any suitable means, e.g., using techniques such as semi-structured information extraction or natural language processing (NLP). For instance, these or similar techniques may be used to extract n-tuples from the message. Each n-tuple, which is a structured set of elements, may be further processed to identify one or more key message terms.

Message parser 116 may further assign a priority to each key message, e.g., based on a field from which the key message term was extracted, based on a sequential position of the key message term within the message, or other suitable criteria. For instance, in some aspects, key message terms falling within subject content may be assigned a higher priority than key message terms falling within message content. In further aspects, key message terms occurring in an earlier sequential position within the message may be assigned a higher priority than key message terms occurring in a later sequential position within the message. As should be appreciated, priorities may be assigned to the key message terms via any suitable algorithm or set of rules. In aspects, as will be described further below, at least some of the key message terms may be indicative of one or more of the plurality of files linked to the message. For instance, the key message term may include, for instance, a term, a phrase, a file extension, a date, a time, or any other extracted information, indicative of at least one of the plurality of files.

In an example, a message may be defined by: a "From" field including a sender name "Joe Doe" associated with a sender email address joe@genco.com; a "To" field including a first recipient name "Suzy Coleman" associated with a first recipient email address suzy@genco.com and a second recipient name "Megan Taylor" associated with a second recipient email address megan@genco.com; a "Subject" field including the text "Friday Deadlines"; and a "Message Body" field including message content of "Hey Guys— Please see the attached PowerPoint and other docs for the deadline this Friday," and a URL of https://onedrive.live.com/redir?resid=63DD90BE&authkey32!A9856eg=folder%. Based on the above information, message parser 116 may extract the sender's name and email address and the first and second recipients' names and email addresses. The message parser 116 may further extract subject content including key message term "Friday Deadlines." Message parser 116 may extract the key message term "Guys" and determine that the term refers to the first and second recipients; may extract the key message term "PowerPoint" and determine that the term refers to at least one file associated with file type "presentation document" with a predicted file extension such as ".ppt" or ".pptx" or ".pez"; may extract the key message term "other docs" and determine that the phrase refers to one or more "document" files (e.g., word processing document, spreadsheet document, presentation document, etc.); and may extract the key message term "deadline this Friday" and determine that the phrase relates to the same topic as the subject content and is associated with a deadline on Jun. 13, 2014.

Additionally, at any time during drafting of a message, routing of a message or receipt of a message, URL parser 118 may follow the URL to identify each of the plurality of files linked to the message. In some aspects, URL parser 118 may be implemented by server 108. In other aspects, URL parser 118 may be implemented by another server, for instance, a server such as server 130 that is in communication with and/or manages a storage location, e.g., storage 126. For instance, with reference to the example message above, URL parser 118 may follow the URL https://onedrive.live.com/redir?resid=63DD90BE&authkey32!A9856eg=folder% to identify ten (10) files linked to the message. Based on a file extension for each of the ten files, URL parser 118 may determine that the ten files include the following file types: a presentation document, two word processing documents, five image files, an audio file, and a spreadsheet document.

URL parser 118 may further identify information about each file based on the structured fields of aggregated metadata associated with each of the plurality of files. For example, based on a title field, URL parser 118 may determine that the presentation document is entitled "Project Launch," a first word processing documents is entitled "To Do Items," a second word processing document is entitled "Script," the spreadsheet document is entitled "Budget," a first image file is entitled "Before" and a second image file is entitled "After." Additionally, based on face recognition data stored in one or more fields of the aggregated metadata, the URL parser 118 may determine that a third image file includes a picture of the sender, a fourth image file includes a picture of the first recipient, and a fifth image file includes a picture of the second recipient. Based on audio-to-text transcription and text analysis, the URL parser 118 may determine that the audio file includes a description of how to operate a device. Further, based on content analysis, URL parser 118 may determine that the spreadsheet document includes a data cell entitled "Grand Total" associated with value "$123.45." As should be appreciated, the above examples of aggregated metadata are not intended to be exhaustive or limiting and additional or different aggregated metadata may be available for each file. As detailed above, aggregated metadata may include, for instance, a term, a phrase, a file extension, a date, a time, or any other information, indicative of file content and/or a file type for a file.

In aspects, file prioritizer 120 may receive the key message terms, including a priority for each key message term, from message parser 116. File prioritizer 120 may further receive aggregated metadata associated with each of the plurality of files from URL parser 118. In some aspects, file prioritizer 120 may be implemented by server 108. In other aspects, file prioritizer 120 may be implemented by another server, for instance, a server such as server 130 that is in communication with and/or manages a storage location, e.g., storage 126. For example, file prioritizer 120 may determine whether each key message term matches aggregated metadata for one or more files. For example, file prioritizer 120 may match a first key message term with first aggregated metadata to identify a first file of the plurality of files; file prioritizer 120 may match a second key message term with second aggregated metadata to identify a second file of the plurality of files; and so on. In some cases, the first key message term may match first aggregated metadata and the second key message term may match second aggregated metadata for the same file.

For example, with reference to the example above, file prioritizer 120 may determine that key message term "Friday Deadlines" matches aggregated metadata "To Do Items" associated with the first word processing document. Additionally, file prioritizer 120 may determine that key message term "PowerPoint" matches a file type (e.g., based on a file extension) for the presentation document and that key message term "other docs" matches file types for the second word processing "document" and the spreadsheet "document." File prioritizer 120 may further determine that image files and audio files are not generally considered "documents" and that the explicit mention of the presentation "document" would exclude it from being referenced by key message term "other docs."

As indicated above, message parser 116 may prioritize each key message term, e.g., based on a field from which the key message term was extracted, based on a sequential ordering of the key message term within the message, or other suitable criteria. Alternatively, rather than message parser 116, file prioritizer 120 may assign priorities to each key message term. In aspects, upon identifying one or more files based on matching key message terms with aggregated metadata, file prioritizer 120 may prioritize the one or more files. For example, file prioritizer 120 may prioritize the one or more files based on a priority assigned to the key message term mapped to the file. As used herein, a key message term mapped to a file corresponds to a key message term that matches aggregated metadata for the file. In some cases, when more than one key message term is mapped to a file, file prioritizer 120 may prioritize the file based on the key message term having the highest priority that maps to the file. In other cases, when more than one key message term is mapped to a file, file prioritizer 120 may generally assign a higher priority to that file. In still other aspects, a key message term may map to more than one file. In this case, each of the mapped files may have the same priority.

As should be appreciated, file prioritizer 120 may prioritize files by any suitable means. Upon prioritizing the files, file prioritizer 120 may rank each file in order of priority, ranking the highest priority file in a first ranking, the second highest priority file in a second ranking, and so on. When files are identified with the same priority, file prioritizer 120 may rank the files alphabetically by file name, temporally by creation date (or last edit date, etc.) in ascending or descending order (e.g., earlier date assigned to a higher ranking or most recent date assigned to a higher ranking), or apply any other suitable ranking.

With reference to the example above, file prioritizer 120 may determine that the first word processing document is the first ranked file because it is mapped to the highest priority key message term (e.g., subject content "Friday Deadlines"). File prioritizer 120 may further determine that the presentation document is the second ranked file because it is mapped to the second highest priority key message term (e.g., "PowerPoint"). The second word processing document and the spreadsheet document may have the same priority because both files are mapped to the third highest priority key message term (e.g., "other docs"). In this case, based on alphabetical priority, file prioritizer 120 may determine that the spreadsheet document is the third ranked file because it is entitled "Budget" and the second word processing document is the fourth ranked file because it is entitled "Script." Other files within the ten linked files may be similarly prioritized and ranked; however, in aspects, at least some of the plurality of files may not map to any key message term and may not be ranked by file prioritizer 120.

As described above, when a user drafts a message to one or more recipients that includes a link to a plurality of files, some of the linked files may be more important or relevant to the message than others. In an example, the plurality of files may be located in a project folder at a storage location. The project folder may include any number of files related to the project, e.g., presentation documents for internal education or external promotion regarding the project, spreadsheet documents for budgeting, forecasting and/or reconciling the project, image files for chronicling or marketing the project, audio files for training regarding the project, and the like. In some cases, tens, fifties, or hundreds of files may be located in the project folder. However, when a user sends a message to another user regarding the project, the message may only be specific or applicable to a subset of the plurality of files within the project folder. Even so, the sender of the message may find it burdensome and/or inefficient to attach the specific or applicable files from the project folder to the message. Rather, the sender may find it more efficient to simply include a link to the project folder. In this case, the one or more recipients of the message may find it burdensome and/or inefficient to search the plurality of files in the project folder to identify the subset of files relevant to the message. This is particularly true when a vast number of files and types of files are included in the project folder.

The thumbnail prioritization application 110 addresses the above problem by automatically identifying files within a plurality of files that are applicable and/or relevant to the message. In aspects, when a file maps to a key message term extracted from the message, it may be identified as a relevant or applicable file within the plurality of files. When more than one file maps to key message terms extracted from the message, each file may be ranked based on its predicted relevance to the message. Additionally, thumbnail previews for each file of the subset of relevant files may be automatically presented in descending rank order in the message. In this way, from the plurality of files, a subset of relevant files is identified, and from the subset, the files most relevant to the message are identified. Thumbnail previews may further be directly linked to the corresponding file within storage, enabling recipients of a message to easily and efficiently identify and access files that are most relevant to the message. Because the files that are most relevant to the message are automatically identified, neither the sender nor the recipient(s) are required to search through a plurality of files to find applicable files. Accordingly, the burden on users is reduced and user efficiency is increased, which leads to a better overall user experience.

Continuing with the examples above, thumbnail presenter 122 may receive rankings for at least a subset of the plurality of files from file prioritizer 120. In aspects, the subset may correspond to files identified by the thumbnail prioritization application 110 as relevant and/or applicable to the message. In some aspects, thumbnail presenter 122 may be implemented by server 108. In other aspects, thumbnail presenter 122 may be implemented by another server, for instance, a server that is in communication with and/or implements a messaging application. For example, thumbnail presenter 122 may present a thumbnail preview within message content for each file within the subset of files in a descending rank order. In some aspects, a predetermined number of thumbnail previews are provided within the message content, e.g., three, five, seven, ten, or any other predetermined number. The predetermined number of thumbnail previews may be selected based on space restrictions within the interface, based on esthetic considerations, or based on any other determination. In aspects, the predetermined number of thumbnail previews is less than the number of files within the plurality of files such that at least some files are not represented by thumbnail previews in the message content.

As used herein, a thumbnail preview is at least a partial representation of the content of a file. In some cases, a thumbnail preview may be an icon representative of a file type (e.g., a document icon including a letter "W" for a word processing document, an "X" for a spreadsheet document, and a "P" for a presentation document, and the like). In other cases, a thumbnail preview may provide a miniaturized view of file content. For instance, a thumbnail preview of a word processing document may provide a miniaturized view of at least a portion of a first page of the word processing document, a thumbnail preview of an image may provide a miniaturized view of at least a portion of the image, and so on. In at least some aspects, a file name may be provided adjacent to each thumbnail preview.

Continuing with the examples above, when thumbnail presenter 122 presents thumbnail previews in descending rank order, a first thumbnail preview for the first ranked file (e.g., the first word processing document) may be presented first, a second thumbnail preview for the second ranked file (e.g., the presentation document) may be presented second, a third thumbnail preview for the third ranked file (e.g., the spreadsheet document) may be presented third, and so on. In some aspects, the thumbnail previews may be presented in descending rank order from left to right within the message content; alternatively, thumbnail previews may be presented in descending rank order from top to bottom within the message content; alternatively still, thumbnail previews may be presented in any structured ordering such that a descending ranking of the thumbnail previews is discernable from the structured ordering. In further aspects, each file corresponding to a thumbnail preview may be directly accessed from storage based on a link embedded within the thumbnail preview. In this way, rather than following the URL to the plurality of files, a recipient of the message may click on a thumbnail preview to automatically access the corresponding file in storage.

Thus, thumbnail prioritization application 110 automatically provides a thumbnail preview for each file identified as relevant and/or applicable to a message. Thumbnail previews are provided in a descending rank order such that thumbnail previews corresponding to the files having the highest predicted relevance are presented first within the message content. Additionally, thumbnail previews are directly linked to the corresponding file within storage, enabling recipients of a message to easily and efficiently identify and access files that are most relevant to the message. Because thumbnail prioritization application 110 automatically identifies files that are most relevant to a message, neither the sender nor the recipient(s) are required to search through a plurality of files to identify applicable files. Accordingly, the thumbnail prioritization application 110 reduces the burden on users and increases user efficiency, which leads to a better overall user experience.

As should be appreciated, the various devices, components, etc., described with respect to FIG. 1 are not intended to limit the systems and methods to the particular components described. Accordingly, additional topology configurations may be used to practice the methods and systems herein and/or some components described may be excluded without departing from the methods and systems disclosed herein.

Figure 2:
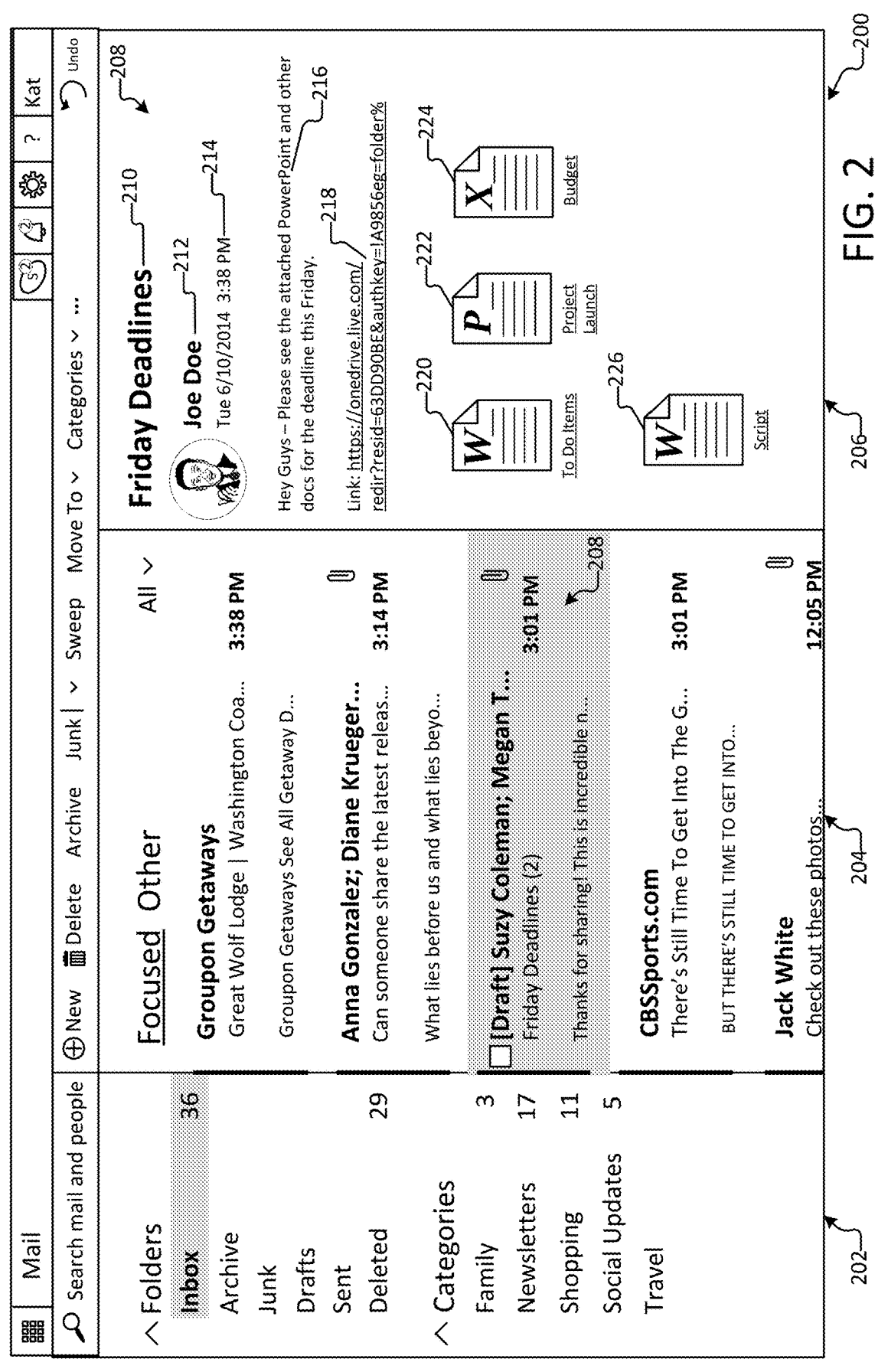

FIG. 2 illustrates an interface for implementing thumbnail prioritization within a message, according to an example embodiment.

As illustrated, an interface 200 of an email application is provided. Interface 200 includes a navigation pane 202, a list pane 204, and a reading pane 206. Email 208 is displayed in reading pane 206 and list pane 204. Email 208 includes a subject line 210, entitled "Friday Deadlines," a sender 212 named "Joe Doe," and a sent time 214 of "Tuesday, Jun. 10, 2014, at 3:38 PM." Email 208 further includes a message 216, which states: "Hey Guys—Please see the attached PowerPoint and other docs for the deadline this Friday," and a URL 218 linking a plurality of files to the email 208: https://onedrive.live.com/ redir?resid=63DD90BE&authkey32 !A9856eg=folder%.

As detailed above, at any time during drafting of email 208, routing of email 208 or receipt of email 208, a message parser (e.g., message parser 116) may parse email 208 to extract information. For instance, email 208 may be parsed to identify the sender 212 (e.g., Joe Doe) and the sent time 214 (e.g., Tuesday, Jun. 10, 2014, at 3:38 PM). Further, subject content including key message term "Friday Deadlines" may be extracted. The email 208 may further be parsed to extract the key message term "Guys," which may be associated with first and second recipients (e.g., Suzy Coleman and Megan Taylor). Additionally, the key message term "PowerPoint" may be extracted and it may be determined that the term refers to at least one file associated with file type "presentation document" with a predicted file extension such as ".ppt" or ".pptx" or ".pez." Additionally, the key message term "other docs" may be extracted and it may be determined that the phrase refers to one or more "document" files (e.g., a word processing document, a spreadsheet document, a presentation document, a PDF document, etc.). The key message term "deadline this Friday" may also be extracted and it may be determined that the phrase relates to the same topic as the subject content and is associated with action items due on Jun. 13, 2014.

Each key message term may further be prioritized, e.g., by message parser 116. In some aspects, key message terms falling within subject content may be assigned a higher priority than key message terms falling within message content. In further aspects, key message terms occurring in an earlier sequential position within email 208 may be assigned a higher priority than key message terms occurring in a later sequential position within email 208. As should be appreciated, priorities may be assigned to the key message terms via any suitable algorithm or set of rules.

Additionally, at any time during drafting of email 208, routing of email 208 or receipt of email 208, a URL parser (e.g., URL parser 118) may follow the URL to identify each of a plurality of files linked to email 208. In an example, a URL 218 of https://onedrive.live.com/ redir?resid=63DD90BE&authkey32 !A9856eg=folder% may be followed to identify ten (10) files linked to email 208. Information about each file may be identified based on structured fields of aggregated metadata (described above)

that are associated with each of the plurality of files. For example, the aggregated metadata may be stored with each file during a pre-processing stage, e.g., when each file is stored at a storage location, and may be representative of file content and/or a file extension for each file. As detailed above, file content may include internal content (e.g., terms, phrases, names, numerical data, charts, tables, images, title, etc.), derived content (e.g., face recognition data, image recognition data, audio-to-text transcription data, etc.), metadata content (author, creation date, file name, file tags, etc.), and the like. A file may further be associated with a file extension, which is indicative of a file type. In some aspects, the aggregated metadata may be organized into structured fields, with each field storing a different type of aggregated metadata.

Continuing with the examples above, a file extension for each of the ten files may be identified and it may be determined that the ten files include the following file types: a presentation document, two word processing documents, five image files, an audio file, and a spreadsheet document. Additionally, based on a title field of the aggregated metadata, it may be determined that the presentation document is entitled "Project Launch," a first word processing documents is entitled "To Do Items," a second word processing document is entitled "Script," the spreadsheet document is entitled "Budget," a first image file is entitled "Before" and a second image file is entitled "After." Additionally, based on face recognition data stored in one or more fields of the aggregated metadata, it may be determined that a third image file includes a picture of sender 212 (e.g., Joe Doe), a fourth image file includes a picture of the first recipient (e.g., Suzy Coleman), and a fifth image file includes a picture of the second recipient (e.g., Megan Taylor).

Additionally, a file prioritizer, e.g., file prioritizer 120, may determine whether each key message term matches aggregated metadata for one or more files. For example, with reference to the examples above, it may be determined that key message term "Friday Deadlines" matches aggregated metadata "To Do Items" associated with the first word processing document. Additionally, it may be determined that key message term "PowerPoint" matches a file type (e.g., based on a file extension) for the presentation document and that key message term "other docs" matches file types for the second word processing "document" and the spreadsheet "document." It may further be determine that image files and audio files are not generally considered "documents" and that the explicit mention of the presentation "document" would exclude it from being referenced by key message term "other docs." In aspects, when a file maps to a key message term extracted from email 208, it may be identified as a relevant or applicable file within the plurality of files. When more than one file maps to a key message term extracted from email 208, each file may be ranked based on a predicted relevance to email 208. In this way, from the plurality of files, a subset of relevant files is identified, and from the subset, the files most relevant to the message are identified.

In aspects, upon identifying one or more files based on matching key message terms with aggregated metadata, the file prioritizer may prioritize the one or more files. For example, the one or more files may be prioritized based on a priority assigned to the key message term mapped to the file. As used herein, a key message term mapped to a file corresponds to a key message term that matches aggregated metadata for the file. With reference to the example above, the file prioritizer may determine that the first word processing document is the first ranked file because it is mapped to the highest priority key message term (e.g., subject content "Friday Deadlines") and the presentation document is the second ranked file because it is mapped to the second highest priority key message term (e.g., "PowerPoint"). The second word processing document and the spreadsheet document may have the same priority because both files are mapped to the third highest priority key message term (e.g., "other docs"). In this case, based on alphabetical priority, it may be determined that the spreadsheet document is the third ranked file because it is entitled "Budget" and the second word processing document is the fourth ranked file because it is entitled "Script." Other files within the ten linked files may be similarly prioritized and ranked; however, in aspects, at least some of the plurality of files may not map to any key message terms and may not be ranked. In aspects, when more than one file maps to a key message term extracted from email 208, each file may be ranked based on a predicted relevance to email 208.

A thumbnail presenter, e.g., thumbnail presenter 120, may receive rankings for at least a subset of the plurality of files from the file prioritizer. In aspects, the subset may correspond to files identified as relevant and/or applicable to email 208. Based on the received information, thumbnail previews may be presented within email 208 for each file of the subset of relevant files in a descending rank order. As illustrated by FIG. 2, when thumbnail previews are provided in descending rank order, a first thumbnail preview 220 for the first ranked file (e.g., the first word processing document entitled "To Do Items") may be presented first, a second thumbnail preview 222 for the second ranked file (e.g., the presentation document entitled "Project Launch") may be presented second, a third thumbnail preview 224 for the third ranked file (e.g., the spreadsheet document entitled "Budget") may be presented third, and a fourth thumbnail preview 226 for the fourth ranked file (e.g., the word processing document entitled "Script") may be presented fourth. As illustrated, four thumbnail previews corresponding to the four files that map to key message terms extracted from email 208 are provided in descending rank order from left to right within the message content. In further aspects, each file corresponding to one of the thumbnail previews 220-226 may be directly accessed from storage based on a link embedded within the thumbnail preview. In this way, rather than following URL 218 to access the plurality of files, a recipient of email 208 may click on a thumbnail preview (e.g., one of thumbnail previews 220-226) to automatically access the corresponding file in storage.

Although not illustrated, in cases where a predetermined number of thumbnail previews are presented, more than four (4) thumbnail previews that correspond to additional files of the plurality of files may be provided. In this example, where the additional files have not been assigned a priority, corresponding thumbnail previews may be provided in alphabetical, temporal, or any other suitable order following the four prioritized thumbnail previews described above.

As illustrated by FIG. 2, thumbnail prioritization application (e.g., thumbnail prioritization application 110) automatically provides a thumbnail preview for each file identified as relevant and/or applicable to email 208. Thumbnail previews are provided in a descending rank order such that thumbnail previews corresponding to the files having the highest predicted relevance to email 208 are presented first. Moreover, each thumbnail preview is directly linked to a corresponding file within storage. In this way, the thumbnail prioritization application allows recipients of email 208 to easily and efficiently identify and access files that are most relevant to the message. Moreover, because the thumbnail prioritization application automatically identifies files that are most relevant, neither the sender (e.g., Joe Doe) nor the recipients (Suzy Coleman and Megan Taylor) are required to search through the plurality of linked files to identify files applicable to email 208. Accordingly, the thumbnail prioritization application reduces the burden on users and increases user efficiency, which leads to a better overall user experience.

As should be appreciated, the various devices, components, etc., described with respect to FIG. 2 are not intended to limit the systems and methods to the particular components described. Accordingly, additional topology configurations may be used to practice the methods and systems herein and/or some components described may be excluded without departing from the methods and systems disclosed herein.

FIG. 3 illustrates an interface for implementing thumbnail prioritization within a reply message, according to an example embodiment.

As illustrated, an interface 300 of an email application is provided. Interface 300 includes a navigation pane 302, a list pane 304, and a reading pane 306. A reply message (e.g., reply 308) is displayed in reading pane 306 and list pane 304. Reply 308 includes a subject line 310, entitled "Re: Friday Deadlines," a sender 312 named "Suzy Coleman," and a sent time 314 of "Tuesday, Jun. 10, 2014, at 4:16 PM." Reply 308 further includes a message 316, which states: "Check out the before and after," and a URL 318 linking a plurality of files to the reply 308: https://onedrive.live.com/redir?resid=63DD90BE&authkey32 !A9856eg=folder%. In aspects, URL 318 links to the same plurality of files as URL 218. As further illustrated, reply 308 responds to email 208, which includes subject line 210, sender 212, and sent time 214, as illustrated by FIG. 2. Email 208 further includes message 216 and URL 218, as detailed above.

In aspects, at any time during drafting of reply 308, routing of reply 308 or receipt of reply 308, a message parser (e.g., message parser 116) may parse reply 308 to extract information. For instance, subject content including key message term "Re: Friday Deadlines" may be extracted. Additionally, the key message term "before" and the key message term "after" may be extracted from message content. Furthermore, each key message term may be assigned a priority, which may be based on a field from which the key message term was extracted, a sequential ordering of the key message term within the message, or other suitable criteria. For instance, in some aspects, key message terms falling within subject content of reply 308 may be assigned a higher priority than key message terms falling within message content. In further aspects, key message terms occurring in an earlier sequential position within reply 308 may be assigned a higher priority than key message terms occurring in a later sequential position within reply 308. In a first example, the key message term "Re: Friday Deadlines" may receive the highest priority because it was extracted from subject content. In this case, the key message term "before" may be assigned a higher priority (e.g., second highest priority) than the key message term "after" (e.g., third highest priority). In a second alternative example, when subject content is associated with a reply (e.g., indicated by "Re:"), a key message term extracted from subject content may receive a lower priority unless the key message term is also referenced within message content. In this case, the key message term "Re: Friday Deadlines" extracted from subject content was not also referenced in the message content and, thus, this key message term may receive a lower priority. Here, the key message term "before" may be assigned the highest priority and the key message term "after" may be assigned the second highest priority.

Additionally, at any time during drafting of reply 308, routing of reply 308 or receipt of reply 308, a URL parser (e.g., URL parser 118) may follow URL 318 to identify each of a plurality of files linked to reply 308, which are, according to an example, the same ten (10) files linked to email 208. Thus, the ten files may include the presentation document entitled "Project Launch," the first word processing documents entitled "To Do Items," the second word processing document entitled "Script," the spreadsheet document entitled "Budget," the first image file, entitled "Before," the second image file, entitled "After," as well as the third, fourth, and fifth image files and the audio file.

A file prioritizer, e.g., file prioritizer 120, may determine whether one or more key message terms match aggregated metadata for one or more files. For example, with reference to the first and second examples above, it may be determined that the key message term "Re: Friday Deadlines" matches aggregated metadata from a file name field "To Do Items" associated with the first word processing document, the key message term "before" matches aggregated metadata from a file name field "Before" associated with the first image file, and the key message term "after" matches aggregated metadata from a file name field "After" associated with the second image file. In aspects, when a file maps to a key message term extracted from the reply 308, it may be identified as a relevant or applicable file within the plurality of files. When more than one file maps to a key message term extracted from reply 308, each file may be ranked based on a predicted relevance to reply 308. In this way, from the plurality of files, a subset of relevant files is identified, and from the subset, the most relevant files are identified.

In aspects, upon identifying one or more files based on matching one or more key message terms with aggregated metadata, the one or more files may be prioritized. For example, the one or more files may be prioritized based on a priority assigned to the key message term mapped to the file. As used herein, a key message term that is mapped to a file corresponds to a key message term that matches aggregated metadata for the file. With reference to the first example above (shown), it may be determined that the first word processing document is the first ranked file because it is mapped to the highest ranked key message term (e.g., subject content "Re: Friday Deadlines"), that the first image file is the second ranked file because it is mapped to the second highest priority key message term (e.g., message content "before"), and that the second image file is the third ranked file because it is mapped to the third highest priority key message term (e.g., message content "after"). Alternatively, according to the second example (not shown), it may be determined that the first image file is the first ranked file because it is mapped to the highest priority key message term (e.g., message content "before"), that the second image file is the second ranked file because it is mapped to the second highest priority key message term (e.g., message content "after"), and that the first word processing document is the third ranked file because it is mapped to the lowest ranked key message term (e.g., subject content "Re: Friday Deadlines"). In the first and second examples, the first word processing document, the first image file and the second image file may be the only files ranked based on a predicted relevance to reply 308. However, other files within the plurality of files may be ordered alphabetically, temporally, or by any other suitable ordering.

As described above, a thumbnail presenter, e.g., thumbnail presenter 122, may receive rankings for at least a subset of the plurality of files from the file prioritizer. In aspects, the subset may correspond to files identified as relevant and/or applicable to reply 308. A thumbnail preview may be presented within the reply 308 for each file within the subset of relevant files in a descending rank order. As illustrated by FIG. 3 in accordance with the first example above, when presenting thumbnail previews in descending rank order, a first thumbnail preview 320 for the first ranked file (e.g., the first word processing document entitled "To Do Items) may be presented first, a second thumbnail preview 322 for the second ranked file (e.g., the first image file entitled "Before") may be presented second, and a third thumbnail preview 324 for the third ranked file (e.g., the second image file entitled "After") may be presented third. As illustrated by FIG. 3, the thumbnail previews may be presented in descending rank order from left to right within reply 308. As should be appreciated, although URL 318 and URL 218 are linked to the same plurality of files, a different presentation of thumbnail previews is provided for reply 308 than for email 208. In aspects, the difference is based at least in part on differences between the content of reply 308 and the content of email 208, which corresponds to differences in the files that are identified as relevant and/or applicable to reply 308 versus email 208.

As illustrated by FIG. 3, the thumbnail prioritization application automatically provides a thumbnail preview for each file identified as relevant and/or applicable to reply 308 (e.g., first thumbnail preview 320, second thumbnail preview 322, and third thumbnail preview 324). Thumbnail previews are provided in a descending rank order such that thumbnail previews corresponding to the files having the highest predicted relevance are presented first within reply 308. Moreover, thumbnail previews are directly linked to the corresponding file within storage. In this way, the thumbnail prioritization application allows recipients of reply 308 to easily and efficiently identify and access files that are most relevant. Moreover, because the thumbnail prioritization application automatically identifies the most relevant files to reply 308, neither the sender (e.g., Suzy Coleman) nor the recipient (e.g., Joe Doe) are required to search through the plurality of linked files to identify applicable files. Accordingly, the thumbnail prioritization application reduces the burden on users and increases user efficiency, which leads to a better overall user experience.

As should be appreciated, the various devices, components, etc., described with respect to FIG. 3 are not intended to limit the systems and methods to the particular components described. Accordingly, additional topology configurations may be used to practice the methods and systems herein and/or some components described may be excluded without departing from the methods and systems disclosed herein.

Figure 4:
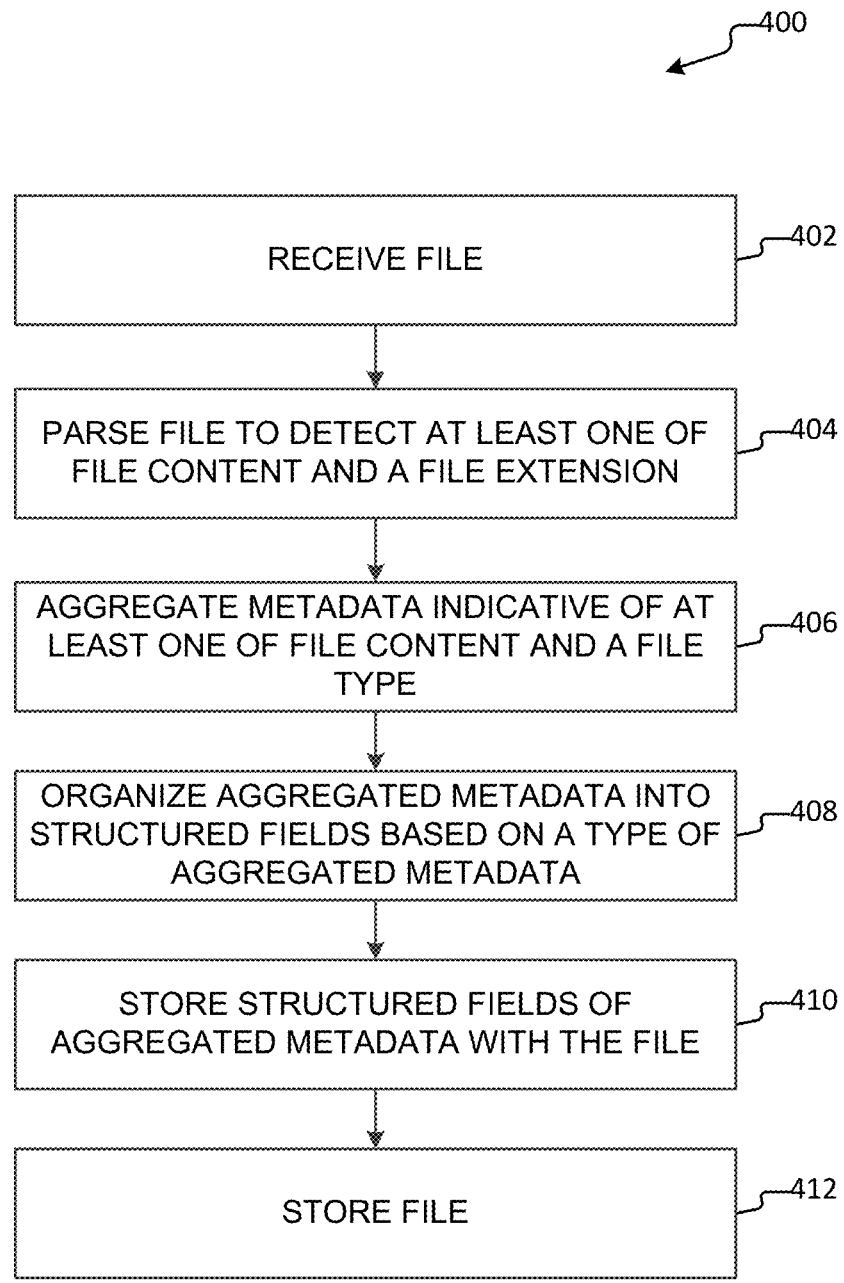
FIG. 4 illustrates a method for parsing a file and aggregating metadata, according to an example embodiment.

FIG. 4 illustrates a method for parsing a file and aggregating metadata, according to an example embodiment.

Method 400 begins with receive operation 402, where a file is received. In aspects, the file may be received for storage, e.g., in storage location 126.

At parse operation 404, the file is parsed to detect file content and/or a file extension. In some aspects, the file may be parsed during pre-processing by a file parser, e.g., file parser 112. As described above, file content may include internal content (e.g., terms, phrases, names, numerical data, charts, tables, images, title, etc.), derived content (e.g., face recognition data, image recognition data, audio-to-text transcription data, etc.), metadata content (author, creation date, file name, file tags, etc.), and the like. The file may further be associated with a file extension, which is indicative of a file type. In aspects, pre-processing the file to detect file content and/or a file extension allows a thumbnail prioritization application to identify the file as relevant and/or applicable to a message more quickly than if processing of the file were performed in real time.

At aggregate operation 406, information regarding file content and/or a file extension for each file may be aggregated as metadata. In this way, pre-processed information regarding the file may be aggregated as metadata for later reference and simplified evaluation of a file. In aspects, the metadata may be aggregated by a metadata aggregator, e.g., metadata aggregator 114.

At organize operation 408, aggregated metadata may be organized into structured fields, with each field storing a different type of aggregated metadata. "Metadata syntax" may dictate rules for structuring the fields that store the aggregated metadata. In some aspects, the aggregated metadata may incorporate any original metadata associated with the file (as described above) such that the original metadata is organized within the structured fields of aggregated metadata. In other aspects, the aggregated metadata may be organized into the structured fields and stored in a separate location from any original metadata associated with a file. In aspects, the aggregated metadata may be organized by a metadata aggregator, e.g., metadata aggregator 114.

At store metadata operation 410, the structured fields of aggregated metadata may be stored with the file, e.g., appended, prepended, etc., with the file. As used herein, "append" refers to storing the structured fields of aggregated metadata in an end of the file and "prepend" refers to storing the structured fields of aggregated metadata to a beginning of the file. In aspects, the aggregated metadata may be stored in any suitable location with respect to the file, including in a remote location that is, for example, identified by pointers, references, etc., or is otherwise associated with the file. In aspects, the aggregated metadata may be stored with the file by a metadata aggregator, e.g., metadata aggregator 114.

At store file operation 412, the file may be stored to a storage location, e.g., storage location 126. As detailed above, the structured fields of aggregated metadata may be stored with the file in the storage location, or in another storage location that is referenced by or otherwise associated with the file. In aspects, the file may be stored by a file parser, e.g., file parser 112, or a metadata aggregator, e.g., metadata aggregator 114.

As should be appreciated, operations 402-412 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 5:
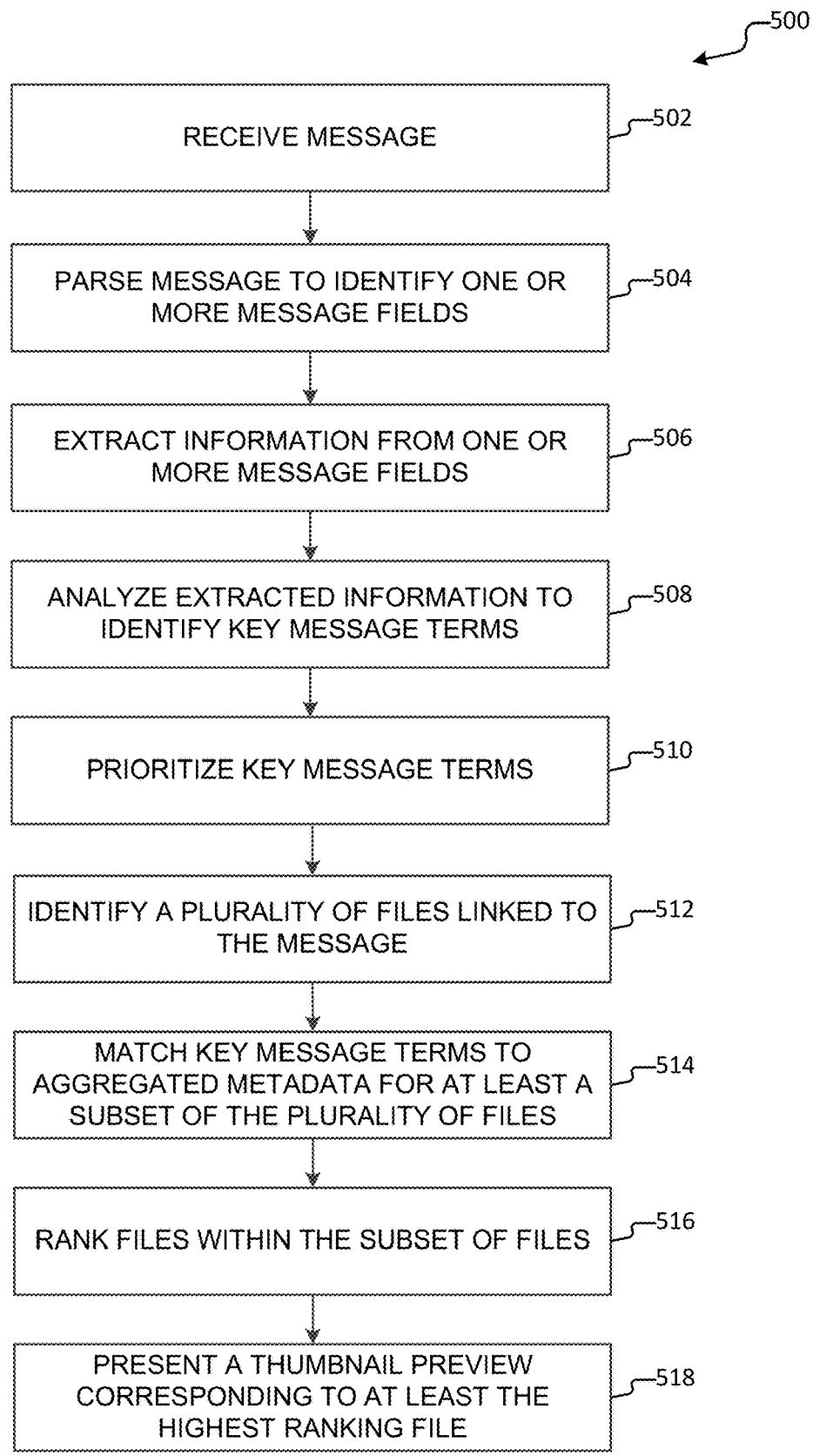
FIG. 5 illustrates a method for presenting prioritized thumbnail previews in a message, according to an example embodiment.

FIG. 5 illustrates a method for presenting prioritized thumbnail previews in a message, according to an example embodiment.

Method 500 begins with receive operation 502, when a message is received from a user. For example, a message may be received at any time during drafting of the message, routing of the message and/or receipt of the message. The message may be received by a messaging application, e.g., an email application, an instant messaging application, a SMS application, and the like, and the messaging application may be in communication with and/or incorporated with a thumbnail prioritization application, e.g., thumbnail prioritization application 110.

At parse operation 504, the message may be parsed to identify one or more message fields. For example, the message may be parsed by a message parser, e.g., message parser 116. As detailed above, the message may include one or more message fields, such as a "Subject" field, a "To" field, a "From" field, a "Message Body" field, and the like. The "To" field may include at least one user identifier for each recipient of the message (e.g., recipient identifier(s)) and the "From" field may include at least one user identifier for a sender of the message (e.g., sender identifier). Subject content within the Subject field of the message may indicate a topic, a purpose, a task, or other information regarding the message. Message content within the Message Body field of the message may include a narrative, a description, instructions, or other information for communication to the one or more recipients of the message. The message content may further include a link to a plurality of files stored at a storage location. In aspects, the link may be a uniform resource locator (URL) mapped to the storage location (e.g., storage 126), which may store the plurality of files in a folder.

At extract operation 506, information may be extracted from the one or more message fields. For example, information may be extracted from the message by a message parser, e.g., message parser 116. In aspects, the message may be processed to extract information from the one or more message fields, e.g., sender identifier, recipient identifier, subject content, message content, and the like.

At analyze operation 508, the extracted information may be analyzed to identify key message terms and/or key message phrases (hereinafter referred to collectively as "key message terms"). For example, the extracted information may be analyzed to identify key message terms by a message parser, e.g., message parser 116. As used herein, a key message term may be indicative of file content or file type. A key message term may be identified by any suitable means, e.g., using techniques such as semi-structured information extraction or natural language processing (NLP). For instance, these or similar techniques may be used to extract n-tuples from the message. Each n-tuple, which is a structured set of elements, may be further processed to identify key message terms.

In an example, as detailed above, a message may be defined by one or more message fields. Key message terms extracted from the one or more message fields may include the name of a sender of the message (e.g., a "From" field may include a sender name "Joe Doe"), the name(s) of one or more recipients of the message (e.g., a "To" field may include a first recipient name "Suzy Coleman" and a second recipient name "Megan Taylor"), a sent time for the message (e.g., a sent time field may include "Tuesday, Jun. 10, 2014, at 3:38 PM"), subject content for the message (e.g., a "Subject" field may include the text "Friday Deadlines"), and message content for the message (e.g., a "Message Body" field may include a message and a URL linking to a plurality of files). For instance, for the message "Hey Guys—Please see the attached PowerPoint and other docs for the deadline this Friday," key message terms may be extracted such as "Guys" (which term may be determined to refer to the first and second recipients), "PowerPoint" (which term may be determined to refer to at least one file associated with file type "presentation document" and a predicted file extension such as ".ppt" or ".pptx" or ".pez," etc.), "other docs" (which phrase may be determined to refer to one or more other "document" files excluding the explicitly-mentioned presentation document), and "deadline this Friday" (which phrase may be determined to relate to the same topic as the subject content and to be associated with a deadline on Jun. 13, 2014).

At prioritize operation 510, the key message terms may be prioritized. In aspects, the key message terms may be prioritized by a message parser, e.g., message parser 116. For example, each key message term may be assigned a priority based on a field from which the key message term was extracted, based on a sequential ordering of the key message term within the message, or any other suitable criteria. In some aspects, key message terms falling within subject content may be assigned a higher priority than key message terms falling within message content. In further aspects, key message terms occurring in an earlier sequential position within the message may be assigned a higher priority than key message terms occurring in a later sequential position within the message. As should be appreciated, priorities may be assigned to the key message terms via any suitable algorithm or set of rules. In the example identified above, key message term "Friday Deadlines" may be assigned the highest priority because it was extracted form subject content and the key message term "PowerPoint" may be assigned the second highest priority because it falls in an earlier sequential position than the key message term "other docs," which may be assigned the third highest priority. Based on sequential ordering with the message content, the key message term "deadline this Friday" may be assigned the fourth highest priority. However, it may be determined that the key message term "deadline this Friday" is the same as key message term "Friday Deadlines," which is assigned to the highest priority. In this case, assignment of the highest priority may supersede assignment of the fourth highest priority for the same key message term.

At identify operation 512, a plurality of files associated with the message may be identified. For example, a URL parser (e.g., URL parser 118) may follow a URL included in the message to identify each of a plurality of files linked to the message. For instance, with reference to examples detailed above, the URL https://onedrive.live.com/redir?resid=63DD90BE&authkey32 !A9856eg=folder% may be parsed to identify ten (10) files linked to the message. Based on a file extension for each of the ten files, it may be determined that the ten files include the following file types: a presentation document, two word processing documents, five image files, an audio file, and a spreadsheet document. Additionally, information about each file may be determined based on structured fields of aggregated metadata associated with each of the plurality of files.

Continuing with the examples above, based on a title field within aggregated metadata, it may be determined that the presentation document is entitled "Project Launch," a first word processing documents is entitled "To Do Items," a second word processing document is entitled "Script," the spreadsheet document is entitled "Budget," a first image file is entitled "Before," and a second image file is entitled "After." Additionally, based on face recognition data stored in one or more fields of the aggregated metadata, it may be determined that a third image file includes a picture of the sender, a fourth image file includes a picture of the first recipient, and a fifth image file includes a picture of the second recipient. Based on audio-to-text transcription and text analysis, it may be determined that the audio file includes a description of how to operate a device.

At match operation 514, one or more key message terms may be matched with aggregated metadata for at least a subset of the plurality of files. For example, a file prioritizer (e.g., file prioritizer 120) may match the one or more key message terms with aggregated metadata for the subset of files. In aspects, when a key message term is matched with aggregated metadata for a file, the file is identified as relevant and/or applicable to the message. For instance, a first key message term may be matched with first aggregated metadata associated with a first file of the plurality of files, a second key message term may be matched with second aggregated metadata associated with a second file of the plurality of files, and so on. In some cases, the first key message term may match first aggregated metadata and the second key message term may match second aggregated metadata for the same file. Continuing with the examples above, it may be determined that key message term "Friday Deadlines" matches aggregated metadata "To Do Items" associated with the first word processing document. Additionally, it may be determined that key message term "PowerPoint" matches a file type (e.g., based on a file extension) for the presentation document and that key message term "other docs" matches file types for the second word processing "document" and the spreadsheet "document."

At rank operation 516, each file within the subset of files may be ranked. In aspects, a file prioritizer (e.g., file prioritizer 120) may rank each file within the subset of files. For example, each file may be ranked based on a priority assigned to the key message term that matches aggregated metadata associated with the file. In some cases, when more than one key message term is mapped to a file, the file may be ranked based on the key message term having the highest priority. In other cases, when more than one key message term is mapped to a file, that file may generally be assigned a higher ranking. Where a key message term is mapped to more than one file, each of the mapped files may have the same priority. In this case, the files having the same priority may be ranked alphabetically by file name, temporally by creation date or last edit date in ascending or descending order, or by other suitable ranking.

With reference to the example above, the first word processing document may be the first ranked file because it is mapped to the highest priority key message term (e.g., subject content "Friday Deadlines") and the presentation document may be the second ranked file because it is mapped to the second highest priority key message term (e.g., "PowerPoint"). The second word processing document and the spreadsheet document may have the same priority because both files are mapped to the third highest priority key message term (e.g., "other docs"). In this case, based on alphabetical priority, it may be determined that the spreadsheet document is the third ranked file because it is entitled "Budget" and that the second word processing document is the fourth ranked file because it is entitled "Script." In aspects, at least some of the plurality of files may not map to any key message terms (e.g., may not be included in the subset of files) and may not receive a ranking.

At present operation 518, a thumbnail preview for at least the highest ranking file may be presented in the message. In aspects, a thumbnail presenter (e.g., thumbnail presenter 122) may present a thumbnail preview within the message for each file within the subset of files in a descending rank order. As used herein, a thumbnail preview is at least a partial representation of the content of a file. Continuing with the example above, a first thumbnail preview for the first ranked file (e.g., the first word processing document) may be presented first, a second thumbnail preview for the second ranked file (e.g., the presentation document) may be presented second, a third thumbnail preview for the third ranked file (e.g., the spreadsheet document) may be presented third, and so on. In further aspects, each file corresponding to a thumbnail preview may be directly accessed from storage based on a link embedded within the thumbnail preview. In this way, rather than following the URL to the plurality of files, a recipient of the message may click on a thumbnail preview to automatically access a relevant file in storage.

Thus, a thumbnail preview may be automatically presented for each file identified as relevant and/or applicable to a message. Moreover, thumbnail previews may be presented in descending rank order such that thumbnail previews corresponding to the files having the highest predicted relevance to the message are presented first. Because thumbnail previews are directly linked to the corresponding file within storage, recipients of the message are able to easily and efficiently identify and access files that are most relevant to the message. In this case, neither the sender nor the recipient(s) are required to search through a plurality of files to identify applicable files. Accordingly, the user burden is reduced and user efficiency is increased, leading to a better overall user experience.

As should be appreciated, operations 502-518 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 6:
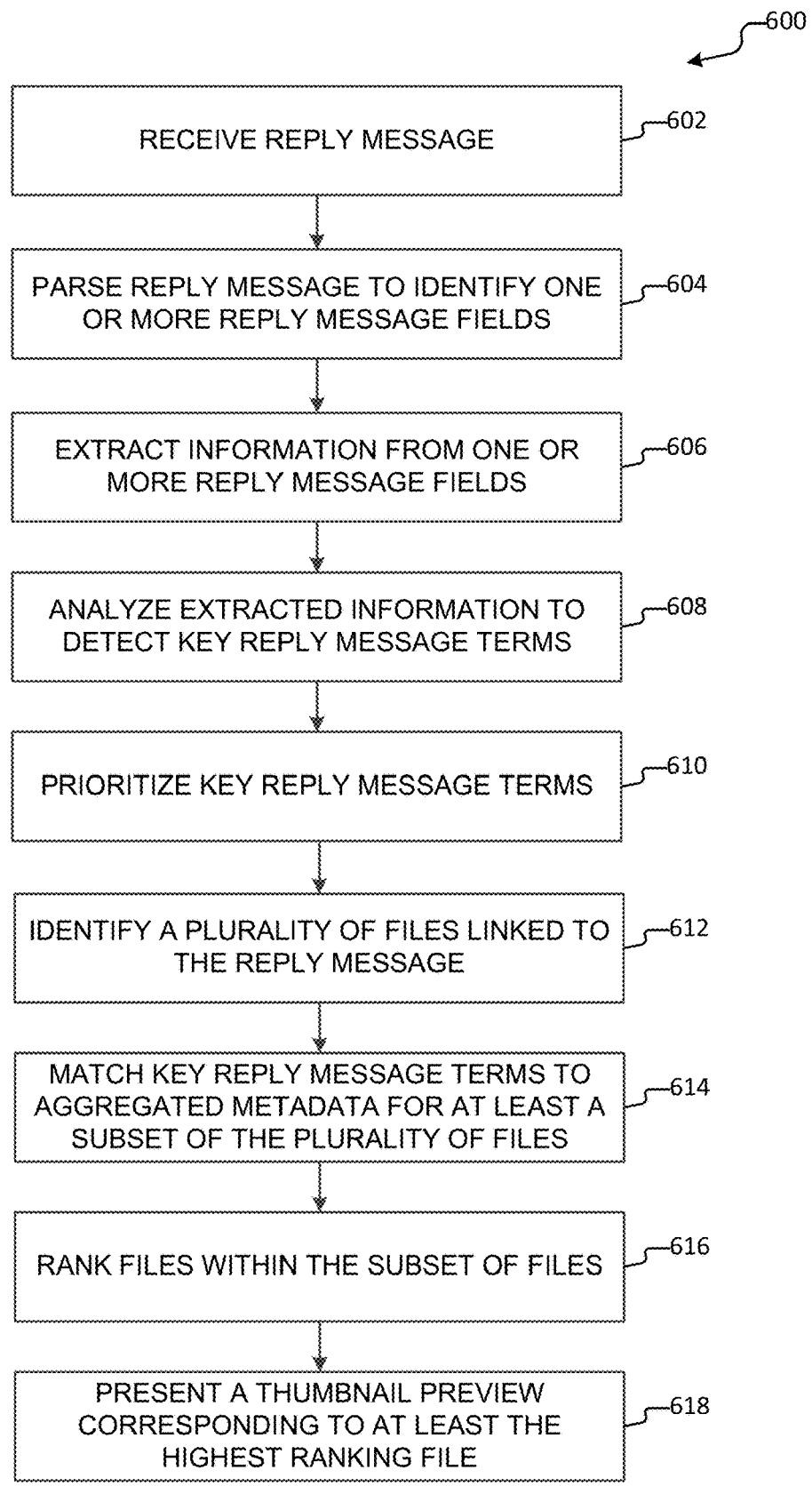
FIG. 6 illustrates a method for presenting prioritized thumbnail previews in a reply message, according to an example embodiment.

FIG. 6 illustrates a method for presenting prioritized thumbnail previews in a reply message, according to an example embodiment.

Method 600 begins with receive operation 602, when a reply message is received from a user. For example, a reply message may be received at any time during drafting of the reply message, routing of the reply message and/or receipt of the reply message. The reply message may be received by a messaging application, e.g., an email application, an instant messaging application, a SMS application, and the like, and the messaging application may be in communication with and/or incorporated into a thumbnail prioritization application, e.g., thumbnail prioritization application 110.

At parse operation 604, the reply message may be parsed to identify one or more reply message fields. For example, the reply message may be parsed by a message parser, e.g., message parser 116. For example, the reply message may include one or more reply message fields, such as a "Subject" field, a "To" field, a "From" field, a "Message Body" field, and the like. The "To" field may include at least one user identifier for each recipient of the reply message (e.g., recipient identifier(s)) and the "From" field may include at least one user identifier for a sender of the reply message (e.g., sender identifier). Subject content within the Subject field of the reply message may indicate a topic, a purpose, a task, or other information regarding the reply message. Message content within the Message Body field of the reply message may include a narrative, a description, instructions, or other information for communication to the one or more recipients of the reply message. The message content may further include a uniform resource locator (URL) mapped to a storage location (e.g., storage 126) comprising the plurality of files, which may be stored in a folder within the storage location. In aspects the URL mapped to a plurality of files associated with the reply message may be the same URL mapped to the plurality of files associated with an original message.

At extract operation 606, information may be extracted from the one or more reply message fields. In aspects, information may be extracted from the reply message by a message parser, e.g., message parser 116. For example, the reply message may be processed to extract information such as a sender identifier, recipient identifier(s), subject content, message content, and the like, from the one or more reply message fields.

At analyze operation 608, the extracted information may be analyzed to identify key message terms and/or key message phrases (hereinafter referred to collectively as "key message terms"). For example, the extracted information may be analyzed to identify key message terms by a message parser, e.g., message parser 116. As used herein, a key message term may be indicative of file content or a file type of an associated file. A key message term may be identified by any suitable means, e.g., using techniques such as semi-structured information extraction or natural language processing (NLP). For instance, these or similar techniques may be used to extract n-tuples from the message. Each n-tuple, which is a structured set of elements, may be further processed to identify key message terms.

In an example, as detailed above, a reply message may be defined by one or more reply message fields. Key message terms extracted from the one or more reply message fields may include the name of a sender of the message (e.g., a "From" field may include a sender name "Suzy Coleman"), the name(s) of one or more recipients of the message (e.g., a "To" field may include at least a recipient name "Joe Doe"), a sent time for the message (e.g., a sent time field may include "Tuesday, Jun. 10, 2014, at 4:16 PM"), subject content for the message (e.g., a "Subject" field may include the text "Re: Friday Deadlines"), and message content for the message (e.g., a "Message Body" field may include a message and a URL linking to a plurality of files). For instance, for the message "Check out the before and after," key message terms may be extracted such as "before" and "after."

At prioritize operation 610, the key message terms may be prioritized. In aspects, the key message terms may be prioritized by a message parser, e.g., message parser 116. For example, each key message term may be assigned a priority based on a field from which the key message term was extracted, based on a sequential ordering of the key message term within the message, or other suitable criteria. In some aspects, key message terms falling within subject content may be assigned a higher priority than key message terms falling within message content. In further aspects, key message terms occurring in an earlier sequential position within the reply message may be assigned a higher priority than key message terms occurring in a later sequential position within the reply message. As should be appreciated, priorities may be assigned to the key message terms via any suitable algorithm or set of rules. In the example identified above, key message term "Re: Friday Deadlines" may be assigned the highest priority because it was extracted form subject content, the key message term "before" may be assigned the second highest priority because it falls in an earlier sequential position than the key message term "after," which may be assigned the third highest priority.

At identify operation 612, a plurality of files associated with the reply message may be identified. For example, a URL parser (e.g., URL parser 118) may follow a URL included in the reply message to identify each of a plurality of files linked to the reply message. For instance, with reference to examples detailed above, the URL https://onedrive.live.com/redir?resid=63DD90BE&authkey32!A9856eg=folder% may be parsed to identify ten (10) files linked to the reply message. As specified above, the URL included in the reply message may link to the same ten files as were linked to the message to which the reply message responds.

Continuing with the examples above, based on a title field within the aggregated metadata, it may be determined that the presentation document is entitled "Project Launch," a first word processing documents is entitled "To Do Items," a second word processing document is entitled "Script," the spreadsheet document is entitled "Budget," a first image file is entitled "Before," and a second image file is entitled "After." Additionally, based on face recognition data stored in one or more fields of the aggregated metadata, it may be determined that a third image file includes a picture of the sender, a fourth image file includes a picture of the first recipient, and a fifth image file includes a picture of the second recipient. Based on audio-to-text transcription and text analysis, it may be determined that the audio file includes a description of how to operate a product.

At match operation 614, one or more key message terms may be matched with aggregated metadata for at least a subset of the plurality of files. For example, a file prioritizer (e.g., file prioritizer 120) may match the one or more key message terms with aggregated metadata for the subset of files. In aspects, when a key message term is matched with aggregated metadata for a file, the file is identified as relevant and/or applicable to the reply message. Continuing with the examples above, it may be determined that key message term "Re: Friday Deadlines" matches aggregated metadata "To Do Items" associated with the first word processing document. Additionally, it may be determined that key message term "before" matches aggregated metadata (e.g., file name "Before) associated with the first image file and that key message term "after" matches aggregated metadata (e.g., file name "After") associated with the second image file.

At rank operation 616, each file within the subset of files may be ranked. In aspects, a file prioritizer (e.g., file prioritizer 120) may rank each file within the subset of files. For example, each file may be ranked based on a priority assigned to the key message term that matches aggregated metadata associated with the file. In some cases, when more than one key message term is mapped to a file, the file may be ranked based on the key message term having the highest priority. In other cases, when more than one key message term is mapped to a file, that file may generally be assigned a higher ranking. Where a key message term is mapped to more than one file, each of the mapped files may have the same priority. In this case, the files having the same priority may be ranked alphabetically by file name, temporally by creation date or last edit date in ascending or descending order, or by any other suitable ranking.

With reference to the examples above, the first word processing document may be the first ranked file because it is mapped to the highest priority key message term (e.g., subject content "Re: Friday Deadlines"), the first image file may be the second ranked file because it is mapped to the second highest priority key message term (e.g., "before"), and the second image file may be the third ranked file because it is mapped to the third highest priority key message term (e.g., "after"). In aspects, at least some of the plurality of files may not map to any key message terms (e.g., may not be included in the subset of files) and may not receive a ranking.

At present operation 618, a thumbnail preview for at least the highest ranking file may be presented in the reply message. In aspects, a thumbnail presenter (e.g., thumbnail presenter 122) may present a thumbnail preview within the reply message for each file within the subset of files in a descending rank order. As used herein, a thumbnail preview is at least a partial representation of the content of a file. Continuing with the examples above, a first thumbnail preview for the first ranked file (e.g., the first word processing document) may be presented first, a second thumbnail preview for the second ranked file (e.g., the first image file) may be presented second, a third thumbnail preview for the third ranked file (e.g., the second image file) may be presented third, and so on. In further aspects, each file corresponding to a thumbnail preview may be directly accessed from storage based on a link embedded within the thumbnail preview. In this way, rather than following the URL to the plurality of files, a recipient of the message may click on a thumbnail preview to automatically access a relevant file in storage.

Thus, a thumbnail preview may be automatically presented for each file identified as relevant and/or applicable to a reply message. Moreover, the thumbnail previews presented for a reply message may be different than the thumbnail previews presented for a message to which the reply message responds. Additionally, thumbnail previews may be presented in descending rank order such that thumbnail previews corresponding to the files having the highest predicted relevance to the reply message are presented first. Because thumbnail previews are directly linked to the corresponding file within storage, recipients of the reply message are able to easily and efficiently identify and access files that are most relevant to the reply message, which may be different than files that are most relevant to the original message. In this case, neither the sender nor the recipient(s) are required to search through a plurality of files to identify applicable files. Thus, the burden on users is reduced and user efficiency is increased, which leads to a better overall user experience.

As should be appreciated, operations 602-618 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

FIGS. 7-10 and the associated descriptions provide a discussion of a variety of operating environments in which aspects of the disclosure may be practiced. However, the devices and systems illustrated and discussed with respect to FIGS. 7-10 are for purposes of example and illustration and are not limiting of a vast number of computing device configurations that may be utilized for practicing aspects of the disclosure, as described herein.

Figure 7:
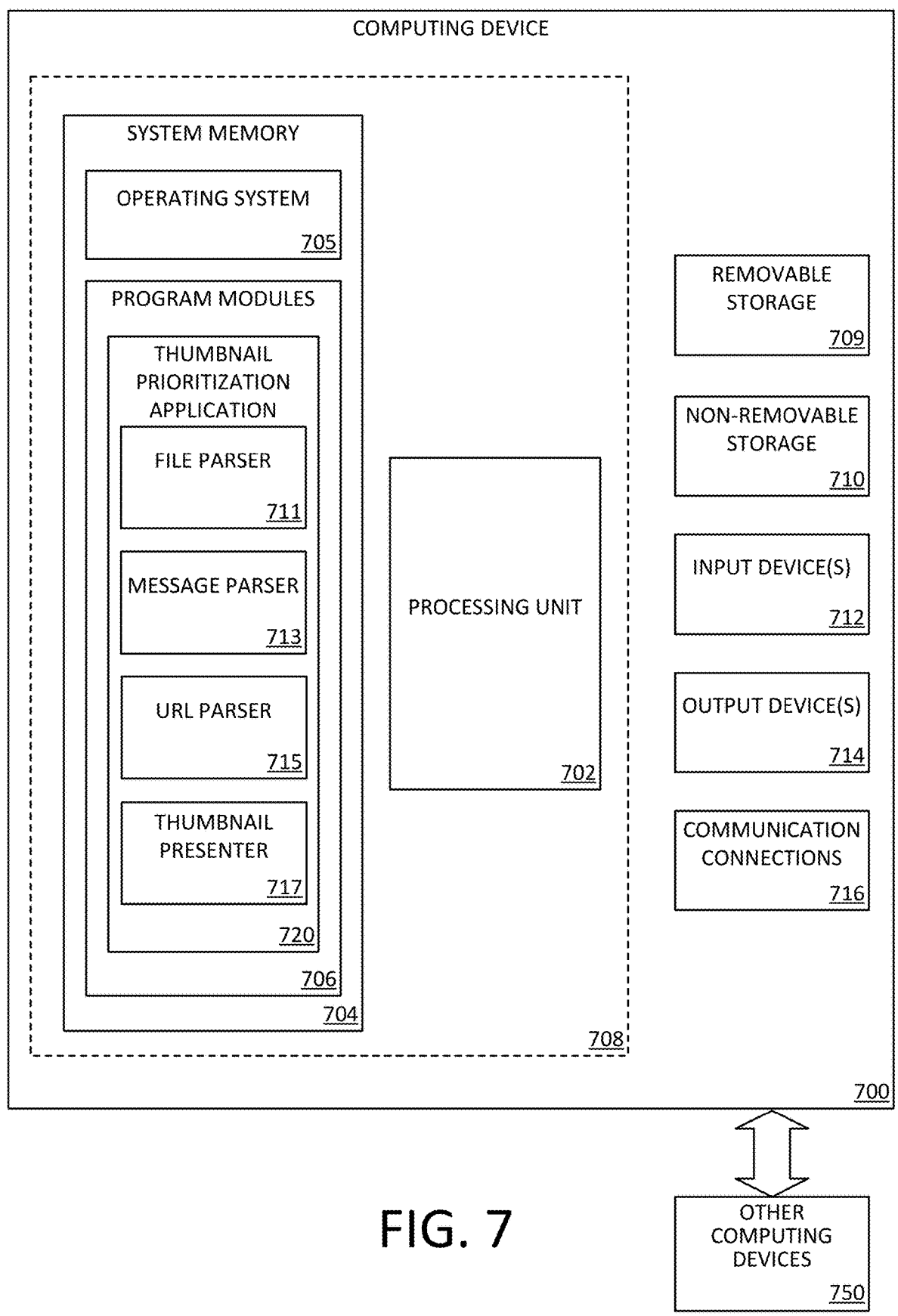
FIG. 7 is a block diagram illustrating example physical components of a computing device with which aspects of the disclosure may be practiced.

FIG. 7 is a block diagram illustrating physical components (e.g., hardware) of a computing device 700 with which aspects of the disclosure may be practiced. The computing device components described below may have computer executable instructions for implementing a thumbnail prioritization application 720 on a computing device (e.g., server computing device 108), including computer executable instructions for thumbnail prioritization application 720 that can be executed to implement the methods disclosed herein. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running thumbnail prioritization application 720, such as one or more components with regard to FIG. 1 and, in particular, file parser 711 (e.g., including file parser 112 and metadata aggregator 114), message parser 713 (e.g., corresponding to message parser 116), URL parser 715 (e.g., corresponding to URL parser 118), and/or thumbnail presenter 717 (e.g., corresponding to file prioritizer 120 and/or thumbnail presenter 122).

The operating system 705, for example, may be suitable for controlling the operation of the computing device 700. Furthermore, embodiments of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 (e.g., thumbnail prioritization application 720) may perform processes including, but not limited to, the aspects, as described herein. Other program modules that may be used in accordance with aspects of the present disclosure, and in particular for presenting thumbnail previews in a message, may include file parser 711, message parser 713, URL parser 715, and/or thumbnail presenter 717, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 700 may also have one or more input device(s) 712 such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
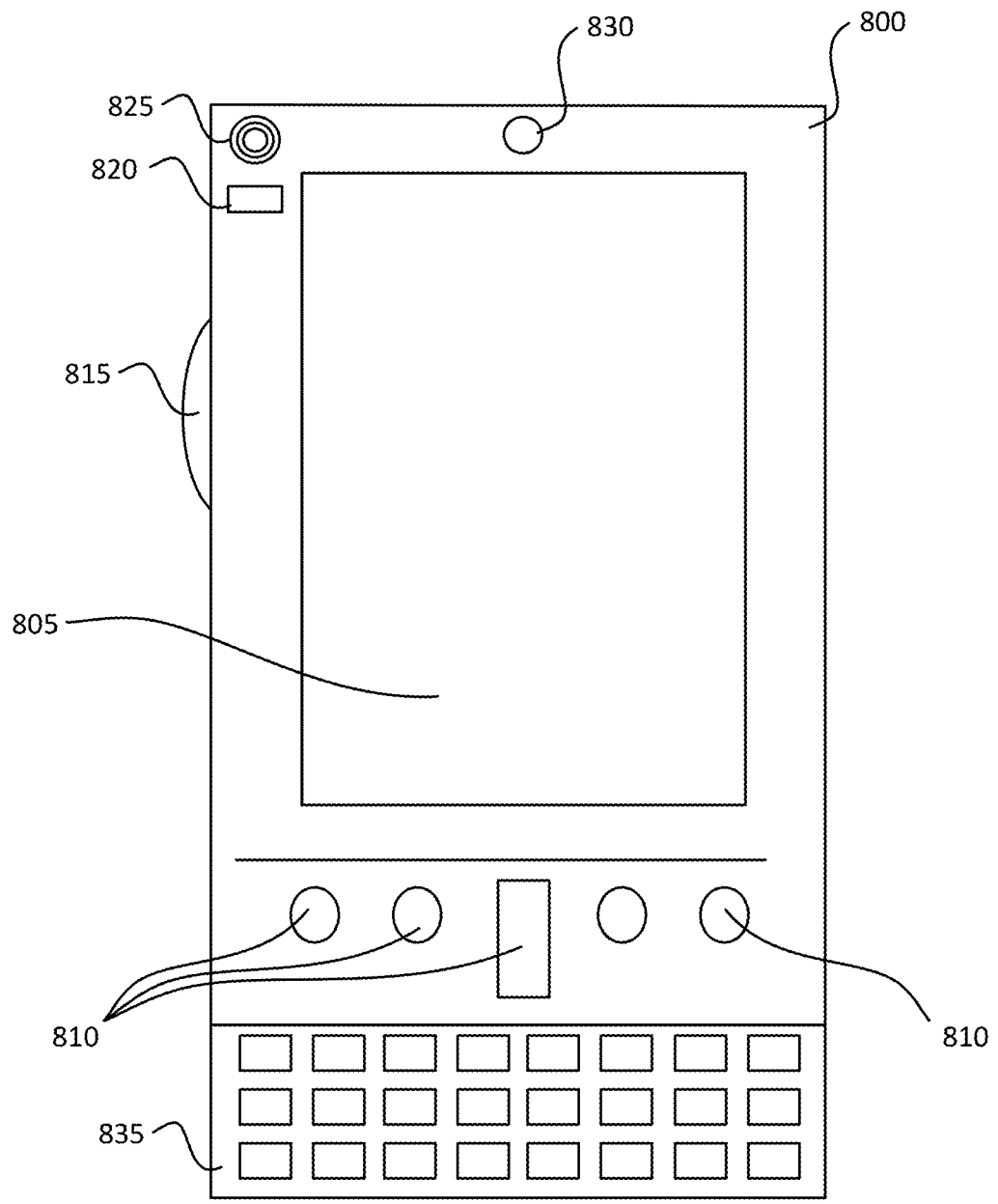
FIGS. 8A and 8B are simplified block diagrams of a mobile computing device with which aspects of the present disclosure may be practiced.
Figure 8B:
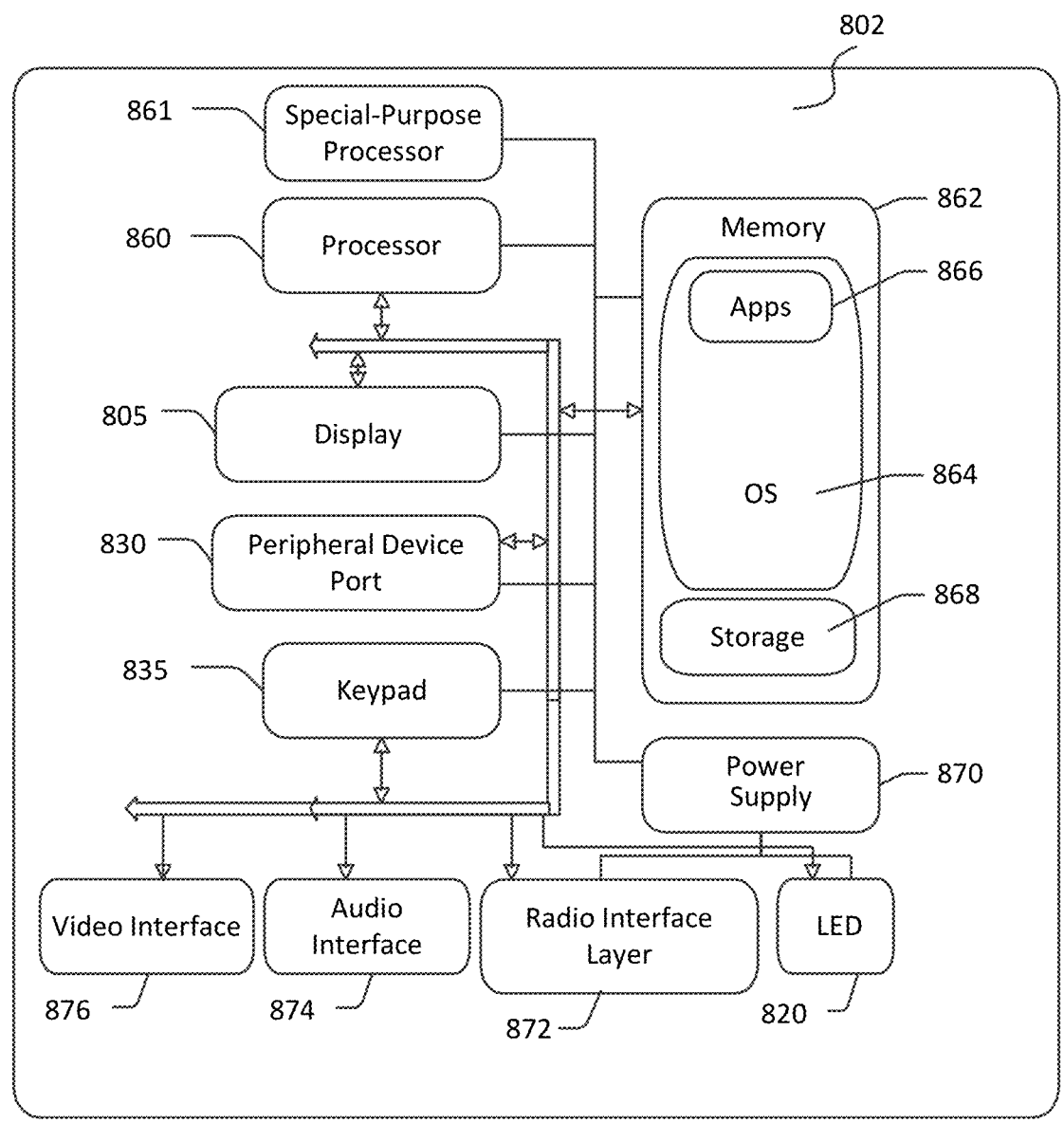

FIGS. 8A and 8B illustrate a mobile computing device 800, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative aspects, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of a mobile computing device. That is, the mobile computing device 800 can incorporate a system (e.g., an architecture) 802 to implement some aspects. In one embodiment, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as email or other messages used by an email application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800, including the instructions for providing a document history interface as described herein (e.g., file parser, message parser, URL parser, and/or thumbnail presenter, etc.).

The system 802 has a power supply 870, which may be implemented as one or more batteries. The power supply 870 may further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via an audio transducer 825 (e.g., audio transducer 825 illustrated in FIG. 8A). In the illustrated embodiment, the visual indicator 820 is a light emitting diode (LED) and the audio transducer 825 may be a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present disclosure, the microphone may also serve as an audio sensor to facilitate control of notifications, as will be described below. The system 802 may further include a video interface 876 that enables an operation of peripheral device 830 (e.g., on-board camera) to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

As should be appreciated, FIGS. 8A and 8B are described for purposes of illustrating the present methods and systems and is not intended to limit the disclosure to a particular sequence of steps or a particular combination of hardware or software components.

Figure 9:
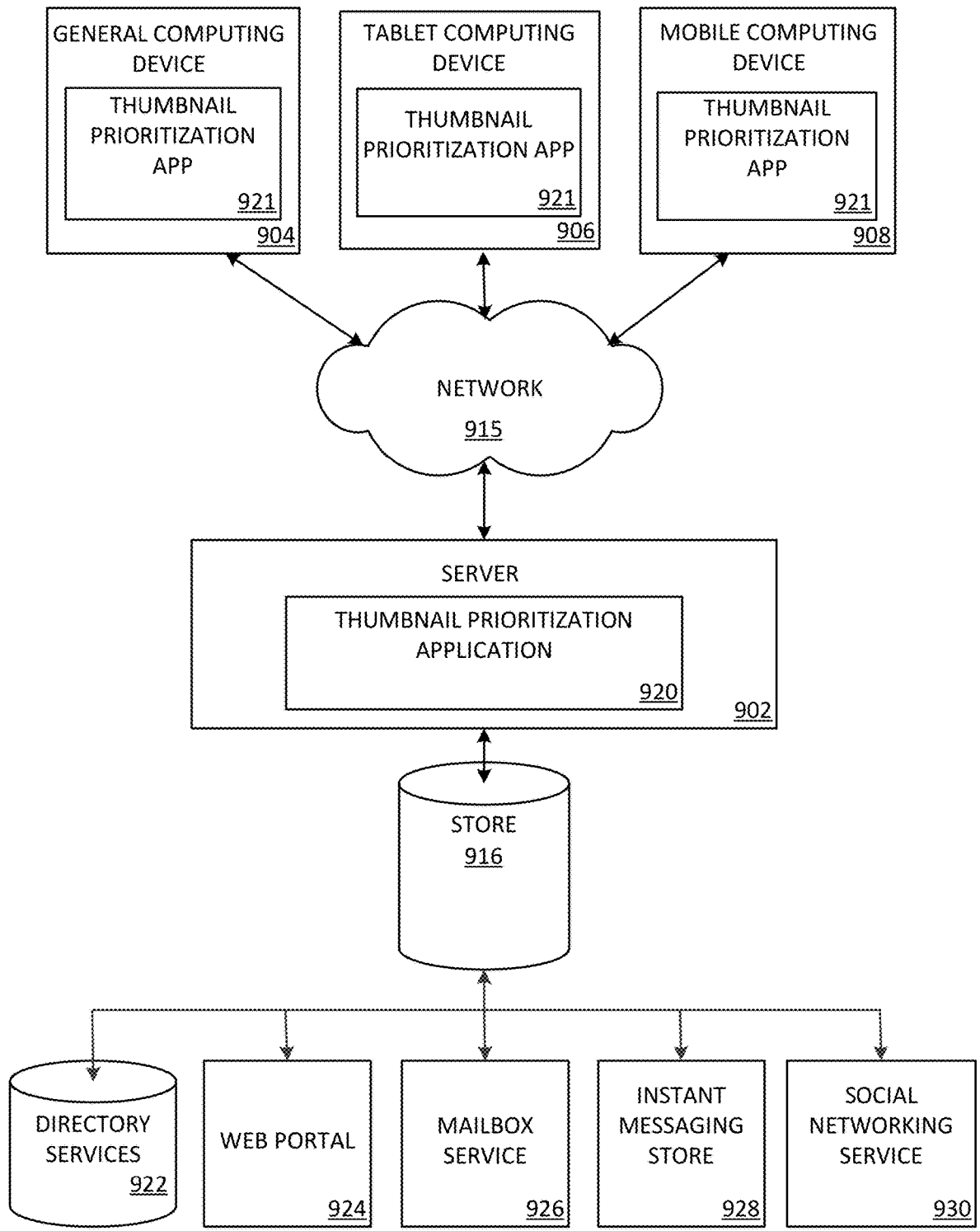
FIG. 9 is a simplified block diagram of a distributed computing system in which aspects of the present disclosure may be practiced.

FIG. 9 illustrates one aspect of the architecture of a system for processing data received at a computing system from a remote source, such as a general computing device 904 (e.g., personal computer), tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking service 930. The thumbnail prioritization application 921 may be employed by a client that communicates with server device 902, and/or the thumbnail prioritization application 920 may be employed by server device 902. The server device 902 may provide data to and from a client computing device such as a general computing device 904, a tablet computing device 906 and/or a mobile computing device 908 (e.g., a smart phone) through a network 915. By way of example, the computer system described above with respect to FIGS. 1-6 may be embodied in a general computing device 904 (e.g., personal computer), a tablet computing device 906 and/or a mobile computing device 908 (e.g., a smart phone).

Any of these embodiments of the computing devices may obtain content from the store 916, in addition to receiving graphical data useable to either be pre-processed at a graphic-originating system or post-processed at a receiving computing system.

As should be appreciated, FIG. 9 is described for purposes of illustrating the present methods and systems and is not intended to limit the disclosure to a particular sequence of steps or a particular combination of hardware or software components.

Figure 10:
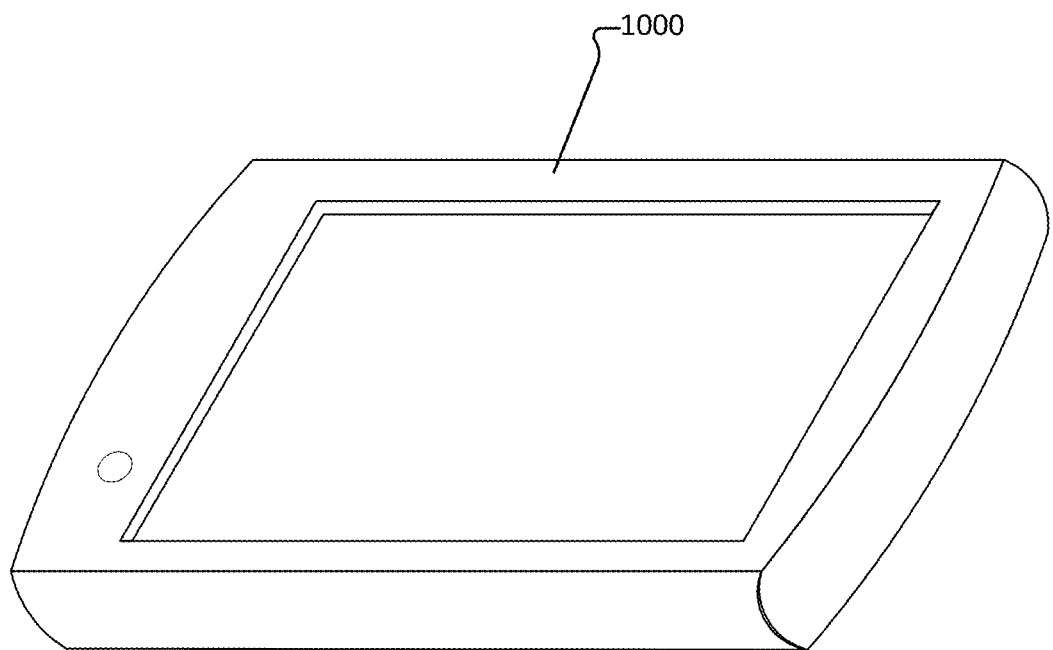
FIG. 10 illustrates a tablet computing device for executing one or more aspects of the present disclosure.

FIG. 10 illustrates an exemplary tablet computing device 1000 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As should be appreciated, FIG. 10 is described for purposes of illustrating the present methods and systems and is not intended to limit the disclosure to a particular sequence of steps or a particular combination of hardware or software components.

In a first aspect, a system is provided. The system includes a processing unit and a memory storing computer executable instructions that, when executed by the processing unit, cause the system to perform a method. The method includes receiving a message and extracting information from the message. The method further includes analyzing the extracted information to identify key message terms and then prioritizing the key message terms. Additionally, the method involves matching the key message terms to one or more files of a plurality of files linked to the message and then ranking the one or more files. The method further includes presenting a thumbnail preview corresponding to at least the highest ranked file.

With further reference to the first aspect, information is extracted from one or more message fields of the message. Additionally or alternatively, the one or more files are ranked based on the priorities of the one or more key message terms. Additionally or alternatively, aggregated metadata is associated with each of the plurality of files and the one or more key message terms are matched to aggregated metadata associated with the one or more files of the plurality of files. With still further reference to the first aspect, the method includes receiving a reply message, extracting information from the reply message and analyzing the extracted information to identify one or more key message terms. Additionally or alternatively, the method includes prioritizing the one or more key message terms and matching the one or more key message terms to one or more files of a plurality of files linked to the reply message. Additionally or alternatively, the method includes ranking the one or more files and presenting a thumbnail preview corresponding to at least the highest ranked file. Additionally or alternatively, the thumbnail preview for the highest ranked file matched to the reply message is different from the thumbnail preview for the highest ranked file matched to the message. Additionally or alternatively, a plurality of thumbnail previews corresponding to a plurality of files is presented in descending rank order based on the ranking of the plurality of files.

In a second aspect, a method is provided. The method includes receiving a message and analyzing extracted information from the message to identify key message terms. The key message terms are prioritized and matched to one or more files of a plurality of files linked to the message. The one or more files are ranked and thumbnail previews corresponding to each of the one or more files are presented in descending rank order. With further reference to the second aspect, the information is extracted from one or more message fields of the message. Additionally or alternatively, the one or more files are ranked based on the priorities of the one or more key message terms. Additionally or alternatively, aggregated metadata is associated with each of the plurality of files.

Additionally or alternatively, with respect to the second aspect, the method further includes receiving a file, parsing the file to identify at least one of file content and a file extension and aggregating metadata indicative of at least one of the file content and the file extension. Additionally or alternatively, the method includes organizing the aggregated metadata into structured fields and storing the structured fields of aggregated metadata with the file. Additionally or alternatively, the one or more key message terms are matched to one or more fields of aggregated metadata associated with the one or more files of the plurality of files. Additionally or alternatively, the method further includes receiving a reply message, analyzing extracted information from the reply message to identify one or more key message terms and prioritizing the one or more key message terms. Additionally or alternatively, the method includes matching the one or more key message terms to one or more files of a plurality of files linked to the reply message, ranking the one or more files and presenting a thumbnail preview corresponding to at least the highest ranked file. Additionally or alternatively, the thumbnail preview for the highest ranked file matched to the reply message is different from the thumbnail preview for the highest ranked file matched to the message.

In a third aspect, a computer-readable storage medium is provided. The computer-readable storage medium stores computer executable instructions that, when executed by at least one processing unit, cause a computing device to receive a message and analyze extracted information from the message to identify one or more key message terms. The key message terms are prioritized and matched to one or more files of a plurality of files linked to the message. The one or more files are ranked and a thumbnail preview corresponding to each of the one or more files is presented in descending rank order. Additionally or alternatively, the one or more files are ranked based on the priorities of the one or more key message terms.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:
1. A system comprising:
at least one hardware processing unit; and
at least one memory storing computer executable instructions that, when executed by the at least one hardware processing unit, cause the system to perform a method, the method comprising:
  receiving, at a recipient device, a message comprising one or more links to a plurality of files comprising at least a first file, a second file, and a third file;
  extracting information from one or more fields of the received message;
  analyzing the extracted information to identify a first key message term, a second key message term, and a third key message term;
  prioritizing the first key message term, the second key message term, and the third key message term to identify a highest priority key message term, wherein the prioritizing is based on at least one of: a priority of the one or more fields of the received message or a sequential ordering of the first key message term and the second key message term within the received message, wherein the priority of the one or more fields is assigned such that a first field of the one or more fields is assigned a first priority and a second field of the one or more fields is assigned a second priority that is different from the first priority;
  matching the first key message term to at least the first file;
  matching the second key message term to at least the second file;
  matching the third key message term to at least the third file;
  prioritizing the first file, the second file, and the third file to identify a highest priority file based on the highest priority key message term;
  causing the recipient device to display, in the received message, a first thumbnail preview corresponding to the first file and a second thumbnail preview corresponding to the second file, wherein a display order of the first thumbnail preview and the second thumbnail preview in the received message is based on the highest priority file; and causing the recipient device to not display a thumbnail preview for the third file based on a priority of the third file.

2. The system of claim 1, wherein the information is extracted from one or more message fields of the received message.

3. The system of claim 1, wherein the first key message term matches aggregated metadata for the first file.

4. The system of claim 1, wherein the plurality of files are associated with the received message using a uniform resource locator (URL).

5. The system of claim 1, wherein aggregated metadata is associated with each of the plurality of files.

6. The system of claim 5, wherein the first key message term and the second key message term are matched to aggregated metadata associated with two or more files of the plurality of files.

7. The system of claim 1, further comprising:
receiving a reply message;
extracting content information from the reply message;
analyzing the extracted content information to identify two or more key reply message content terms;
prioritizing the two or more key reply message content terms to identify at least one high-ranking key reply message content term;
matching the two or more key reply message content terms to two or more files of a plurality of files linked to the reply message;
identifying at least one file of the two or more files that matches the high-ranking key message reply content term of the reply message; and
causing display of a thumbnail preview corresponding to the at least one file.

8. The system of claim 7, wherein the thumbnail preview for the at least one file matched to the reply message is different from the first thumbnail preview and the second thumbnail preview.

9. The system of claim 3, wherein a plurality of thumbnail previews corresponding to the plurality of files is presented in descending rank order based on the ranking of the plurality of files.

10. A method performed by a computing device, the computing device comprising at least one hardware processing unit and at least one memory storing computer executable instructions that, when executed by the at least one hardware processing unit, cause the computing device to:
receive, at a recipient device, a message comprising one or more links to a plurality of files comprising at least a first file, a second file, and a third file;
analyze extracted content information from one or more fields of the received message to identify a first key message term, a second key message term, and a third key message term;
prioritize the first key message term, the second key message term, and the third key message term to identify a highest priority key message content term, wherein the prioritizing is based on at least one of: a priority of the one or more fields of the received message or a sequential ordering of the first key message term and the second key message term within the received message, wherein the priority of the one or more fields is assigned such that a first field of the one or more fields is assigned a first priority and a second field of the one or more fields is assigned a second priority that is different from the first priority;
match the first key message term to at least the first file;
match the second key message term to at least the second file;
matching the third key message term to at least the third file;
prioritize the first file, the second file, and the third file to identify a highest priority file based on the highest priority key message term;
cause the recipient device to display, in the received message, a first thumbnail preview corresponding to the first file and a second thumbnail preview corresponding to the second file, wherein a display order of the first thumbnail preview and the second thumbnail preview in the received message is based on the highest priority file; and
causing the recipient device to not display a thumbnail preview for the third file based on a priority of the third file.

11. The method of claim 10, wherein the information is extracted from one or more message fields of the received message.

12. The method of claim 10, wherein the first key message term matches aggregated metadata for the first file, and wherein the first thumbnail preview and the second thumbnail preview are presented in descending rank order.

13. The method of claim 10, wherein the plurality of files are associated with the received message using a uniform resource locator (URL).

14. The method of claim 10, wherein aggregated metadata is associated with each of the plurality of files.

15. The method of claim 14, further causing the computing device to:
receive a file;
parse the file to identify at least one of file content or a file extension;
aggregate metadata indicative of at least one of the file content or the file extension;
organize the aggregated metadata into structured fields; and
store the structured fields of aggregated metadata with the file.

16. The method of claim 14, the first key message term and the second key message term are matched to one or more fields of aggregated metadata associated with the plurality of files.

17. The method of claim 10, further causing the computing device to:
receive a reply message;
analyze extracted content information from the reply message to identify two or more key reply message content terms;
prioritize the two or more key reply message content terms to identify at least one high-ranking key reply message content term;
match the two or more key reply message content terms to two or more files of a plurality of files linked to the reply message;
identify at least one file of the two or more files that matches the high-ranking key reply message content term of the reply message; and
cause display of a thumbnail preview corresponding to the at least one file.

18. The method of claim 17, wherein the thumbnail preview for the at least one file matched to the reply message is different from the first thumbnail preview and the second thumbnail preview.

19. A computer-readable storage medium storing computer executable instructions that, when executed by at least one hardware processing unit, cause a computing device to:
- receive, at a recipient device, a message comprising one or more links to a plurality of files comprising at least a first file, a second file, and a third file;
- analyze extracted content information from the received message to identify a first key message term, a second key message term, and a third key message term;
- prioritize the first key message term, the second key message term, and the third key message term to identify a highest priority key message term, wherein the prioritizing is based on at least one of: a priority of one or more fields of the received message or a sequential ordering of the first key message term and the second key message term within the received message, wherein the priority of the one or more fields is assigned such that a first field of the one or more fields is assigned a first priority and a second field of the one or more fields is assigned a second priority that is different from the first priority;
- match the first key message term to at least the first file;
- match the second key message term to at least the second file;
- matching the third key message term to at least the third file;
- prioritize the first file, the second file, and the third file to identify a highest priority file based on the highest priority key message term;
- cause the recipient device to display, in the received message, a first thumbnail preview corresponding to the first file and a second thumbnail preview corresponding to the second file, wherein a display order of the first thumbnail preview and the second thumbnail preview in the received message is based on the highest priority file; and
- cause the recipient device to not display a thumbnail preview for the third file based on a priority of the third file.

20. The computer-readable storage medium of claim 19, wherein the first key message term matches aggregated metadata for the first file.

* * * * *